(12) United States Patent
Dai et al.

(10) Patent No.: US 11,831,236 B2
(45) Date of Patent: Nov. 28, 2023

(54) BIDIRECTIONAL MULTIPLE-PORT POWER CONVERSION SYSTEM AND METHOD

(71) Applicant: Huawei Digital Power Technologies Co., Ltd., Shenzhen (CN)

(72) Inventors: Heping Dai, Plano, TX (US); Dianbo Fu, Frisco, TX (US); Huibin Zhu, Plano, TX (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/516,325

(22) Filed: Nov. 1, 2021

(65) Prior Publication Data
US 2022/0069700 A1 Mar. 3, 2022

Related U.S. Application Data

(60) Division of application No. 16/899,456, filed on Jun. 11, 2020, now Pat. No. 11,165,338, which is a
(Continued)

(51) Int. Cl.
*H02M 1/00* (2006.01)
*H02M 1/42* (2007.01)
(Continued)

(52) U.S. Cl.
CPC ......... *H02M 1/4208* (2013.01); *H02M 3/155* (2013.01); *H02M 7/217* (2013.01)

(58) Field of Classification Search
CPC ............. H02M 1/4208; H02M 3/1582; H02M 3/33584; H02M 1/007; H02M 3/33592;
(Continued)

(56) References Cited

U.S. PATENT DOCUMENTS 6,329,726 B1 12/2001 Lau et al.
6,987,679 B2 1/2006 Gan et al.
(Continued)

FOREIGN PATENT DOCUMENTS

| CN | 102510235 A | 6/2012 |
|---|---|---|
| CN | 103095168 A | 5/2013 |
| CN | 105934876 A | 9/2016 |

OTHER PUBLICATIONS

Park, K., et al., "A Bidirectional Double Uneven Power Converter Based DC-DC Converter for Solid-State Transformers", Electronics, 7, 334, Nov. 19, 2018, 20 Pages.

*Primary Examiner* — Hai L Nguyen
(74) *Attorney, Agent, or Firm* — Slater Matsil, LLP

(57) ABSTRACT

A bidirectional power conversion system includes three power conversion ports. A first power conversion port includes a power factor correction device and a primary power conversion network. A second power conversion port includes a plurality of switches and a plurality of diodes, wherein an output voltage of the second power conversion port is regulated through adjusting an output voltage of the power factor correction device as well as through adjusting an operating parameter of the primary power conversion network. A third power conversion port includes a first switch network and a power regulator connected in cascade, wherein the first power conversion port, the second power conversion port and the third power conversion port are magnetically coupled to each other through a transformer.

15 Claims, 13 Drawing Sheets

Related U.S. Application Data continuation of application No. PCT/US2019/039174, filed on Jun. 26, 2019.

(51) Int. Cl.
*H02M 3/155* (2006.01)
*H02M 7/217* (2006.01)

(58) Field of Classification Search
CPC ...... H02M 1/008; H02M 3/335; H02M 7/487; H02J 7/02; H02J 3/38
USPC .................................. 307/130, 131, 31, 151
See application file for complete search history.

(56) References Cited

U.S. PATENT DOCUMENTS

| | | |
|---|---|---|
| 8,232,674 B2 | 7/2012 | Phadke |
| 10,243,367 B2 * | 3/2019 | Inoue ...................... H02J 3/381 |
| 10,312,807 B2 * | 6/2019 | Miki ...................... H01M 10/46 |
| 10,965,219 B2 | 3/2021 | Werner et al. |
| 11,165,338 B2 * | 11/2021 | Dai ......................... B60L 53/22 |
| 2010/0128498 A1 | 5/2010 | Nymand |
| 2014/0103860 A1 | 4/2014 | Kominami et al. |
| 2015/0372499 A1 | 12/2015 | Purcarea et al. |
| 2016/0016469 A1 | 1/2016 | Khaligh et al. |
| 2016/0016479 A1 | 1/2016 | Khaligh et al. |
| 2018/0337610 A1 | 11/2018 | Leong et al. |
| 2019/0143822 A1 | 5/2019 | Malek et al. |

* cited by examiner

BIDIRECTIONAL MULTIPLE-PORT POWER CONVERSION SYSTEM AND METHOD

PRIORITY CLAIM

This application is a divisional of U.S. patent application Ser. No. 16/899,456, entitled "Bidirectional Multiple-Port Power Conversion System and Method," and filed on Jun. 11, 2020, now U.S. Pat. No. 11,165,338 issued on Nov. 2, 2021, which is a continuation of International Application No. PCT/US2019/039174, entitled "Bidirectional Multiple-Port Power Conversion System and Method," and filed on Jun. 26, 2019, each is hereby incorporated by reference in its entirety.

TECHNICAL FIELD

The present disclosure relates to a bidirectional multiple-port power conversion system and in particular embodiments to a bidirectional three-port power conversion system connected between a single-phase AC power source and a plurality of batteries.

BACKGROUND

The power electronics industry has experienced rapid growth due to continuous improvements in the exponential development of new technologies. As the power electronics technologies further advances, on-board battery chargers have become a key element for some new energy applications. One of the most important new energy applications is electric vehicles (EV). Different EVs are equipped with different capacity and voltage batteries. The EVs need suitable chargers for charging a variety of batteries.

An on-board battery charger comprises electrical circuits for converting alternating current (AC) power into direct current (DC) power. The on-board battery charger may include an AC/DC stage and a DC/DC stage. The inputs of the AC/DC stage are connected to the AC utility line. The AC/DC stage is employed to convert the AC input voltage from the AC utility line to a suitable DC bus voltage. The AC/DC stage may comprise a variety of electromagnetic interference (EMI) filters, a bridge rectifier formed by four diodes and a power factor correction circuit.

The EMI filter is employed to reduce high frequency noise that may cause interference with other devices of the on-board battery charger. As a result of employing the EMI filters, the on-board battery charger may meet various EMI regulations. The bridge rectifier converts an AC voltage into a full-wave rectified DC voltage. Such a full-wave rectified DC voltage provides a DC input voltage for the power factor correction circuit. The power factor correction circuit may be implemented by a suitable power converter such as a boost converter. By employing an appropriate control circuit, the boost converter is capable of shaping the input line current to be sinusoidal and in phase with the sinusoidal input voltage of the AC input source. As a result, the power factor of the AC/DC stage may be close to unity as required by a variety of international standards The DC/DC stage is connected between the outputs of the AC/DC stage and a plurality of batteries. The DC/DC stage may comprise an isolated DC/DC power converter having one primary winding, a plurality of secondary windings and a plurality of rectifiers for converting the DC bus voltage into a plurality of isolated DC voltages for charging the plurality of batteries.

SUMMARY

These problems are generally solved or circumvented and the technical advantages are generally achieved by preferred embodiments of the present disclosure which provide a power conversion system and method for bidirectional power transferring between an AC power source and a plurality of batteries.

In accordance with an embodiment, a power conversion system comprises three power conversion ports. A first power conversion port includes a power factor correction device and a primary power conversion network. A second power conversion port includes a plurality of switches and a plurality of diodes, an output voltage of the second power conversion port regulated through adjusting an output voltage of the power factor correction device as well as through adjusting an operating parameter of the primary power conversion network. A third power conversion port includes a first switch network and a power regulator connected in cascade with the first switch network, the first power conversion port, the second power conversion port, and the third power conversion port magnetically coupled to each other through a transformer.

The power factor correction device is a three-level neutral point clamped power factor correction converter. The primary power conversion network is a three-level inductor-inductor-capacitor (LLC) converter. The plurality of switches and the plurality of diodes form a first rectifier and a second rectifier connected in parallel to the first rectifier, the first switch network is a third rectifier and the power regulator is a step-down DC/DC converter.

The first rectifier includes a first switch, a second switch connected in series with the first switch, a third switch and a fourth switch connected in series with the third switch, wherein a common node of the first switch and the second switch is connected to a first terminal of a first secondary winding of the transformer, and a common node of the third switch and the fourth switch is connected to a second terminal of the first secondary winding of the transformer through a first secondary capacitor. The second rectifier includes a first diode, a second diode connected in series with the first diode, a third diode and a fifth switch connected in series with the third diode, wherein a common node of the first diode and the second diode is connected to a first terminal of a second secondary winding of the transformer, and a common node of the third diode and the fifth switch is connected to a second terminal of the second secondary winding of the transformer through a second secondary capacitor.

The first rectifier and the second rectifier are configured as a first voltage doubler and a second voltage doubler, respectively through configuring the fourth switch and the fifth switch as always-on switches.

The third rectifier includes a sixth switch, a seventh switch connected in series with the sixth switch, an eighth switch and a ninth switch connected in series with the eighth switch, wherein a common node of the sixth switch and the seventh switch is connected to a first terminal of a third secondary winding of the transformer, and a common node of the eighth switch and the ninth switch is connected to a second terminal of the third secondary winding of the transformer through a third secondary capacitor.

In accordance with another embodiment, a method comprises transferring energy from an AC power source to a first DC load through a power factor correction device, a primary power conversion network and a first secondary power conversion network, the first secondary power conversion network being magnetically coupled to the primary power conversion network through a transformer and transferring energy from the AC power source to a second DC load through the power factor correction device, the primary power conversion network and a second secondary power conversion network that includes a power regulator, the second secondary power conversion network being magnetically coupled to the primary power conversion network through the transformer.

The method further comprises regulating a voltage across the first DC load through adjusting an output voltage of the power factor correction device, and regulating a voltage across the second DC load through adjusting a duty cycle of the power regulator.

The method further comprises configuring the power regulator to operate in a bypass mode in response to a first system operation condition where an input voltage of the power regulator is within a first predetermined range.

The method further comprises configuring the power regulator to operate as a linear regulator in response to a second system operation condition where an input voltage of the power regulator is within a second predetermined range.

The method further comprises configuring the first DC load as a power source to provide power for at least one of the second DC load and an AC load connected to terminals of the AC power source.

The method further configuring the second secondary power conversion network to operate in a boost converter mode by shorting a secondary side winding of the transformer through turning on two lower switches of a third rectifier of the second secondary power conversion network, wherein the third rectifier and the power regulator are connected in cascade between the secondary side winding and the second DC load.

In accordance with yet another embodiment, a power conversion system comprises a power factor correction device and a power conversion network connected in cascade between an AC power source and a first winding of a transformer, a first bridge and a second bridge connected in parallel, wherein the first bridge is between a second winding of the transformer and a first DC load, and the second bridge is between a third winding of the transformer and the first DC load, and a third bridge and a power regulator connected in cascade between a fourth winding of the transformer and a second DC load.

An advantage of an embodiment of the present disclosure is achieving a bidirectional high-efficiency power conversion system between an AC power source and a plurality of batteries.

The foregoing has outlined rather broadly the features and the technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The make and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a bidirectional multiple-port power conversion system. The present disclosure may also be applied, however, to a variety of power conversion systems. Hereinafter, various embodiments will be explained in detail with reference to the accompanying drawings.

Figure 1:
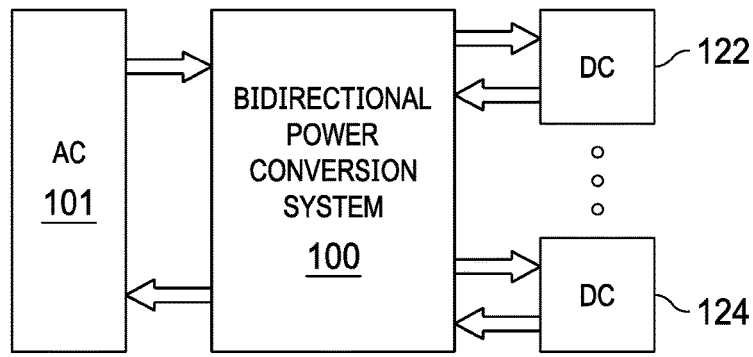
FIG. 1 illustrates a bidirectional multiple-port power conversion system in accordance with various embodiments of the present disclosure.

FIG. 1 illustrates a bidirectional multiple-port power conversion system in accordance with various embodiments of the present disclosure. The bidirectional multiple-port power conversion system 100 is connected between an AC element 101 and a plurality of DC elements 122 and 124. Depending on different applications and design needs, the AC element 101 can be implemented as either an AC power source or an AC load. Likewise, the plurality of DC elements 122 and 124 can be implemented as either DC loads or DC power sources.

Throughout the description, the AC element 101 may be alternatively referred to as an AC power source 101 or an AC load 101 depending on different system configurations. Likewise, each of the plurality of DC elements 122 and 124 may be alternatively referred to as a DC load or a DC power source depending on different system configurations.

In some embodiments, when the bidirectional multiple-port power conversion system 100 is configured to convert AC power into DC power, the AC element 101 is implemented as an AC power source from a utility grid. More particularly, the AC element 101 may be implemented as a single-phase AC power source. The plurality of DC elements 122 and 124 may be a plurality of DC loads such as battery packs, downstream power converters and the like. In some embodiments, the DC elements 122 and 124 may be batteries of an electric vehicle. The bidirectional multiple-port power conversion system 100 shown in FIG. 1 may function as an electric vehicle charging converter.

In alternative embodiments, when the bidirectional multiple-port power conversion system 100 is configured to convert DC power into DC power between different DC loads, one of the plurality of DC elements (e.g., DC element 122) functions as a DC power source, and another DC element (e.g., DC element 124) is configured as a DC load. The DC power source is able to provide power for the DC load through the bidirectional multiple-port power conversion system 100. It should be noted that the DC power source (e.g., DC element 122) is capable of providing power for a plurality of DC loads (e.g., DC element 124) through the bidirectional multiple-port power conversion system 100.

Furthermore, when the bidirectional multiple-port power conversion system 100 is configured to convert DC power into AC power, at least one of the DC elements (e.g., DC element 122) can be implemented as a DC power source. The AC element 101 is implemented as an AC load. One (e.g., DC element 122) or a combination of the plurality of DC elements (e.g., DC elements 122 and 124) may provide power to the AC load 101.

In some embodiments, the bidirectional multiple-port power conversion system 100 may comprise a transformer having a primary winding and a plurality of secondary windings. The bidirectional multiple-port power conversion system 100 further comprises a power factor correction device and a primary power conversion network connected in cascade between the AC element 101 and the primary winding of the transformer. A plurality of secondary power conversion networks is connected between the plurality of secondary windings and the DC elements respectively. The detailed structure of the bidirectional multiple-port power conversion system 100 will be described below with respect to FIG. 2.

In operation, the bidirectional multiple-port power conversion system 100 may be configured as an AC/DC power conversion system. The AC element 101 is a single phase AC power source. The power factor correction device is configured such that the power factor of the bidirectional multiple-port power conversion system 100 is adjusted to a level approximately equal to unity through adjusting the input current flowing into the power factor correction device. Furthermore, the power factor correction device is capable of varying its output voltage in a wide range. Such a wide range helps to regulate a main output voltage of the bidirectional multiple-port power conversion system 100.

The primary power conversion network may be implemented as a three-level inductor-inductor-capacitor (LLC) resonant converter. In some embodiments, the three-level LLC resonant converter is able to operate at a switching frequency substantially equal to the resonant frequency of the three-level LLC resonant converter. As a result of having a three-level LLC resonant converter operating at a switching frequency substantially equal to the resonant frequency, the bidirectional multiple-port power conversion system 100 is a high efficiency power conversion system.

The plurality of secondary power conversion networks are implemented as secondary rectifiers, each of which is able to convert an alternating polarity waveform received from a secondary winding of the transformer to a single polarity waveform.

In operation, the bidirectional multiple-port power conversion system 100 may be configured as a DC/DC power conversion system. The AC element 101 is disconnected from the bidirectional multiple-port power conversion system 100. One of the DC elements (e.g., DC element 122) is configured as a DC power source. At least one of the other DC elements (e.g., DC element 124) is configured as a DC load. The DC power source 122 is employed to provide power for the DC load 124 through the bidirectional multiple-port power conversion system 100. In particular, the secondary power conversion network connected to the DC power source 122 is configured as a full-bridge switching network. The secondary power conversion network connected to the DC load 124 is configured as a secondary rectifier. The power is transferred from the DC power source 122 to the DC load 124 through the full-bridge switching network, the transformer and the secondary rectifier.

In operation, the bidirectional multiple-port power conversion system 100 may be configured as a DC/AC power conversion system. The AC element 101 is implemented as an AC load. At least one of the DC elements (e.g., DC element 122) is configured as a DC power source. The DC power source 122 is employed to provide power for the AC load 101 through the bidirectional multiple-port power conversion system 100. In particular, the secondary power conversion network connected to the DC power source 122 is configured as a full-bridge switching network. The primary power conversion network is configured as a rectifier converting an alternating polarity waveform received from the primary winding of the transformer to a single polarity waveform, and establishing a DC voltage bus. The power factor correction device is configured as an inverter to convert the DC voltage on the DC voltage bus into an AC voltage for the AC load 101.

In operation, the bidirectional multiple-port power conversion system 100 may be configured as a hybrid power conversion system. The AC element 101 is implemented as an AC load. At least one of the DC elements (e.g., DC element 122) is configured as a DC power source, and at least one of the other DC elements (e.g., DC element 124) is configured as a DC load. The DC power source 122 is employed to provide power for the AC load 101 and the DC load 124 simultaneously through the bidirectional multiple-port power conversion system 100. In particular, the secondary power conversion network connected to the DC power source 122 is configured as a full-bridge switching network. The secondary power conversion network connected to the DC load 124 is configured as a secondary rectifier. The primary power conversion network is configured as a rectifier converting an alternating polarity waveform received from the primary winding of the transformer to a single polarity waveform, and establishing a DC voltage bus. The power factor correction device is configured as an inverter to convert the DC voltage on the DC voltage bus into an AC voltage for the AC load 101.

Figure 2:
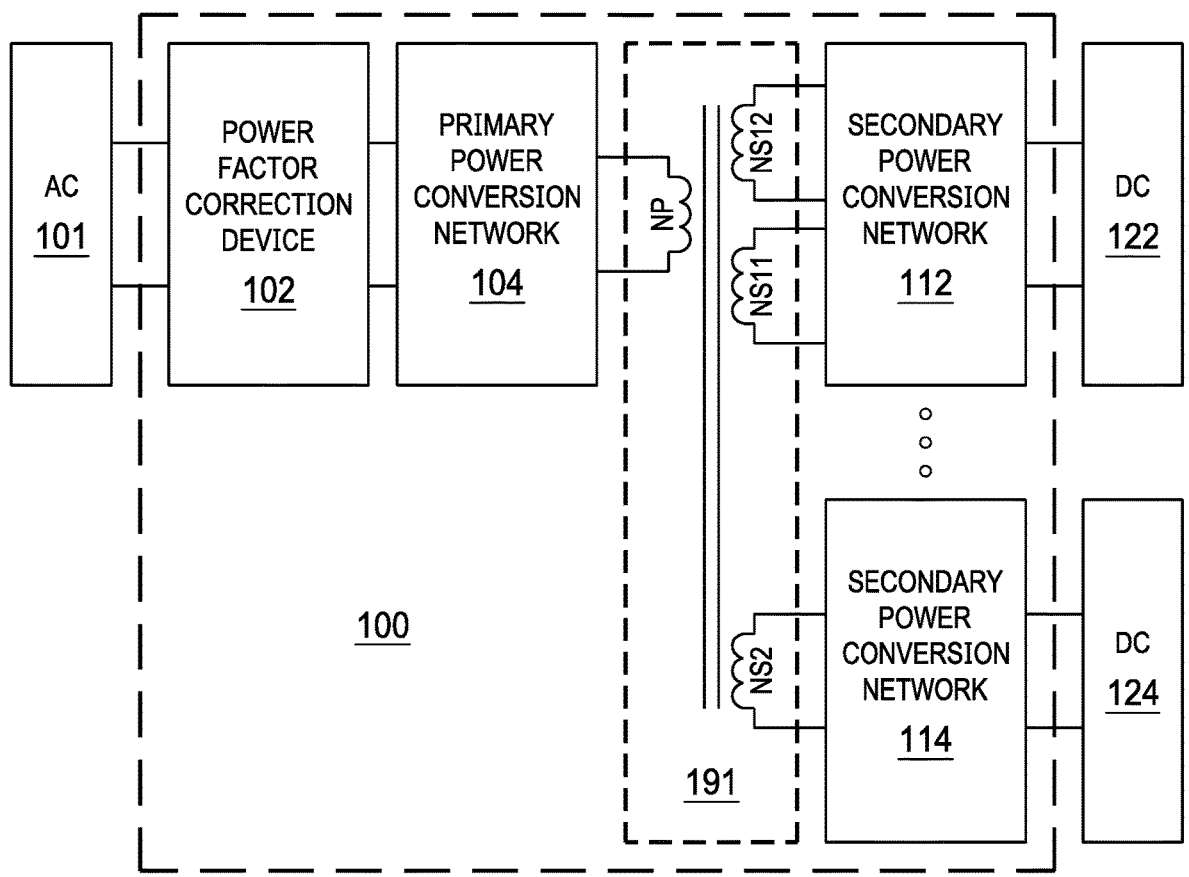
FIG. 2 illustrates a block diagram of the bidirectional multiple-port power conversion system shown in FIG. 1 after the multiple-port power conversion system is configured to operate as an AC/DC system in accordance with various embodiments of the present disclosure.

FIG. 2 illustrates a block diagram of the bidirectional multiple-port power conversion system shown in FIG. 1 after the multiple-port power conversion system is configured to operate as an AC/DC system in accordance with various embodiments of the present disclosure. The bidirectional multiple-port power conversion system 100 comprises a power factor correction device 102 and a primary power conversion network 104 connected in cascade between the AC element 101 and a primary winding NP of a transformer 191. The bidirectional multiple-port power conversion system 100 further comprises a plurality of secondary power conversion networks 112 and 114. As shown in FIG. 2, the secondary power conversion network 112 is connected between the secondary windings NS11, NS12 and the DC element 122. The secondary power conversion network 114 is connected between the secondary winding NS2 and the DC element 124.

It should be recognized that while FIG. 2 illustrates the bidirectional multiple-port power conversion system 100 with two secondary power conversion networks, the bidirectional multiple-port power conversion system 100 could accommodate any number of secondary power conversion networks and their respective DC elements. Each secondary power conversion network between the secondary power conversion networks 112 and 114 may be connected with two secondary windings like the system configuration of the secondary power conversion network 112. Alternatively, each secondary power conversion network between the secondary power conversion networks 112 and 114 may be connected with one secondary winding like the system configuration of the secondary power conversion network 114.

In some embodiments, the power factor correction device 102 of the bidirectional multiple-port power conversion system 100 is configured such that the power factor of the bidirectional multiple-port power conversion system 100 is adjusted to a level approximately equal to unity through adjusting the input current flowing into the power factor correction device 102. The power factor correction device 102 may be implemented as any suitable power factor correction converters such as boost power factor correction rectifiers, Vienna rectifiers and the like. The detailed schematic diagram of the power factor correction device 102 will be described below with respect to FIG. 4.

In some embodiments, the primary power conversion network 104 is implemented as a three-level LLC resonant converter. More particularly, the primary power conversion network 104 comprises the primary side switching network of the three-level LLC resonant converter and a resonant tank. In some embodiments, the primary power conversion network 104 is configured as an unregulated power converter. The switching frequency of the plurality of switches of the primary power conversion network 104 is equal to the resonant frequency of the resonant tank. Alternatively, depending on design needs and different applications, the switching frequency of the plurality of switches of the three-level LLC resonant converter may vary in a narrow range to help the bidirectional multiple-port power conversion system 100 regulate one of the output voltages. The detailed schematic diagram of the primary power conversion network 104 will be described below with respect to FIG. 4.

The transformer 191 provides electrical isolation between the primary side (side having 102 and 104) and the secondary side (side having 112 and 114) of the bidirectional multiple-port power conversion system 100. In accordance with an embodiment, the transformer 191 may be formed of a primary transformer winding and a plurality of secondary transformer windings (e.g., windings NS11, NS12 and NS2) as shown in FIG. 2. It should be noted that the transformer illustrated herein and throughout the description are merely examples which should not unduly limit the scope of the claims. One of ordinary skill in the art would recognize many variations, alternatives, and modifications. For example, the transformer 191 may further comprise a variety of bias windings and gate drive auxiliary windings.

The secondary power conversion network (e.g., secondary power conversion network 112) converts an alternating polarity waveform received from the secondary winding of the transformer 191 to a single polarity waveform. The secondary power conversion network may be formed of two pairs of switching elements such as the n-type metal oxide semiconductor (NMOS) transistors. Alternatively, the secondary power conversion network may be formed of two pairs of diodes. Furthermore, the secondary power conversion network may be formed of a combination of switching elements and diodes. The secondary power conversion network may also be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed operation and structure of the secondary power conversion network will be discussed below with respect to FIG. 4.

It should be noted that three-level LLC resonant converter is merely an example, which should not unduly limit the scope of the claims. One of ordinary skill in the art would recognize many variations, alternatives, and modifications. The primary power conversion network 104 can be implemented as any suitable isolated converters such as flyback converters, forward converters, push-pull converters, half-bridge converters, full-bridge converters, any combinations thereof and the like.

Figure 3:
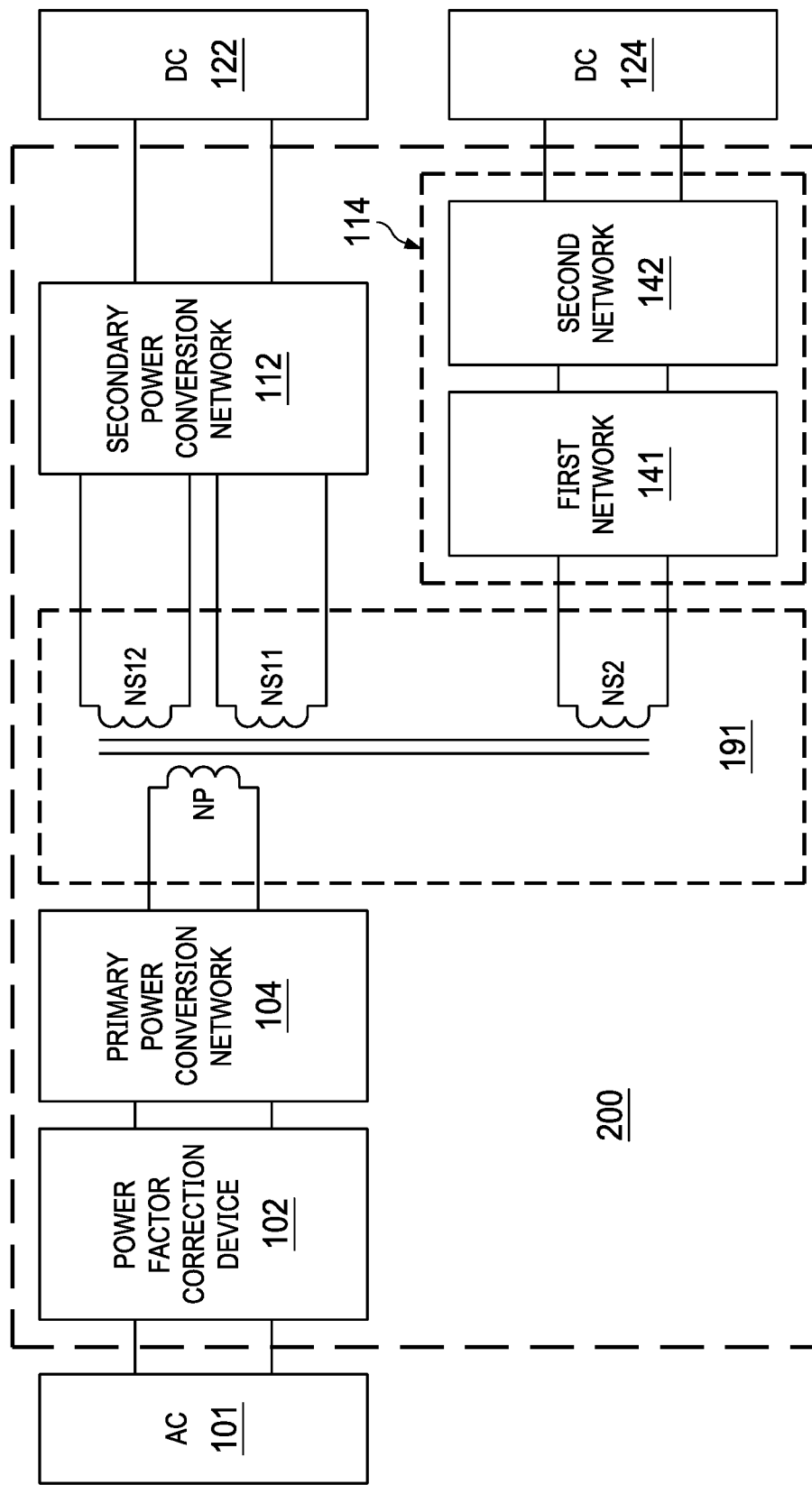
FIG. 3 illustrates a block diagram of a bidirectional three-port power conversion system in accordance with various embodiments of the present disclosure.

FIG. 3 illustrates a block diagram of a bidirectional three-port power conversion system in accordance with various embodiments of the present disclosure. The bidirectional three-port power conversion system 200 is similar to the bidirectional multiple-port power conversion system 100 shown in FIG. 2 except that only two secondary power conversion networks are connected to the transformer 191.

As shown in FIG. 3, a first port of the bidirectional three-port power conversion system 200 comprises the power factor correction device 102 and the primary power conversion network 104 connected in cascade between the AC element 101 and the primary winding NP. A second port comprises a first secondary power conversion network 112 connected between the secondary windings NS11, NS12, and the DC element 122. A third port comprises a second secondary power conversion network 114 connected between the secondary winding NS2 and the DC element 124. As shown in FIG. 3, the second secondary power conversion network 114 comprises a first network 141 and a second network 142 connected in cascade. In some embodiments, the first network 141 is a rectifier and the second network 142 is a power regulator for regulating the voltage applied to the DC element 124.

Figure 4:
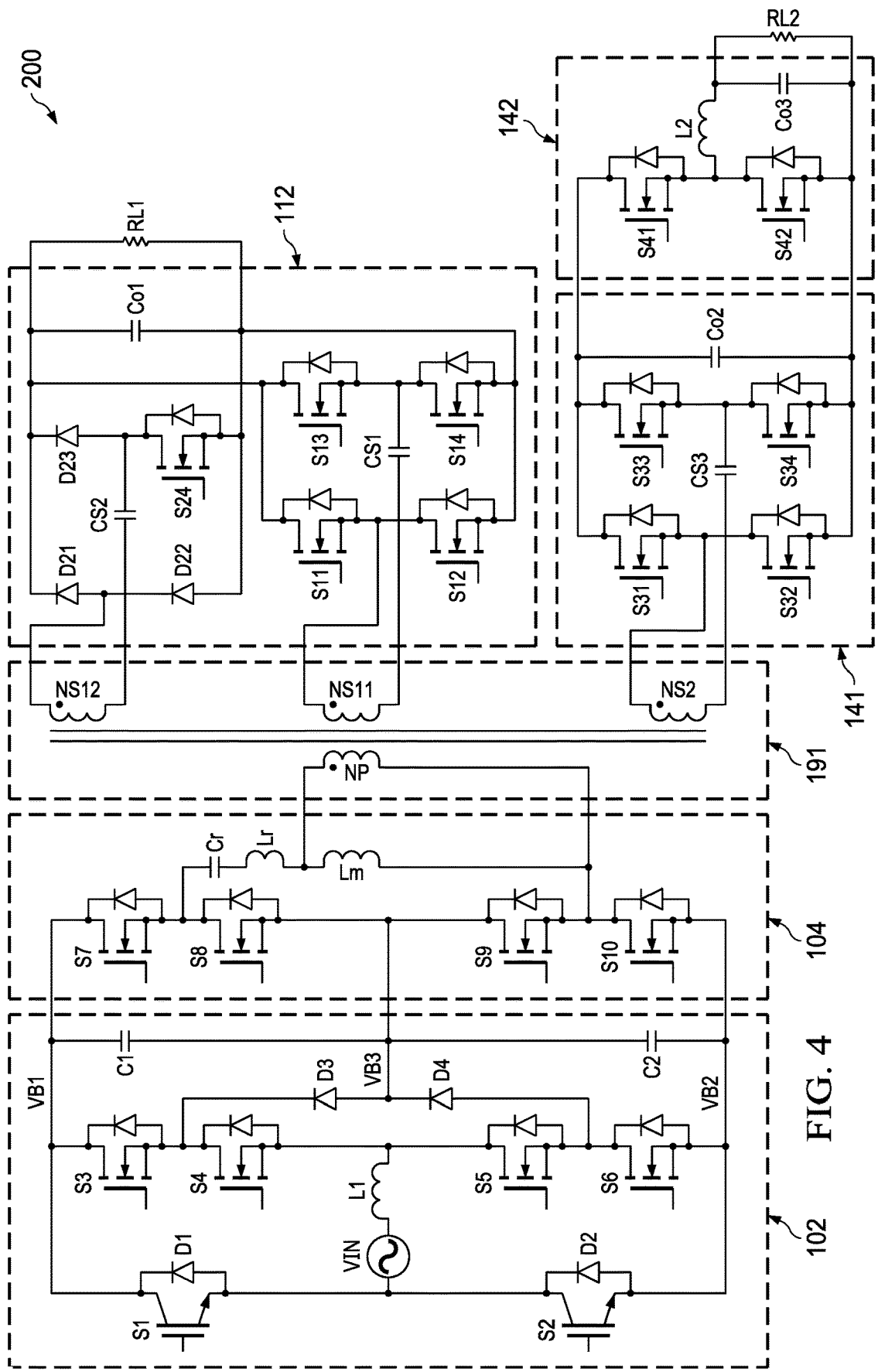
FIG. 4 illustrates a schematic diagram of a first implementation of the bidirectional three-port power conversion system shown in FIG. 3 in accordance with various embodiments of the present disclosure.

FIG. 4 illustrates a schematic diagram of a first implementation of the bidirectional three-port power conversion system shown in FIG. 3 in accordance with various embodiments of the present disclosure. The bidirectional three-port power conversion system 200 comprises a power factor correction device 102, a primary power conversion network 104, a transformer 191, a first secondary power conversion network 112 and a second secondary power conversion network comprising a first network 141 and a power regulator 142. The power factor correction device 102 is implemented as a neutral-point clamped (NPC) boost power factor correction converter. Throughout the description, the power factor correction device 102 may be alternatively referred to as an NPC boost power factor correction converter. The primary power conversion network 104 comprises a primary side network of a three-level LLC resonant converter. Throughout the description, the primary power conversion network 104 may be alternatively referred to as a three-level LLC resonant converter.

The first secondary power conversion network 112 comprises a diode rectifier and a synchronous rectifier. Throughout the description, the synchronous rectifier may be alternatively referred to as a first rectifier, and the diode rectifier may be alternatively referred to as a second rectifier. The first network 141 is implemented as a synchronous rectifier. Throughout the description, the first network 141 may be alternatively referred to as a third rectifier. The second network 142 is implemented as a power regulator. Throughout the description, the second network 142 may be alternatively referred to as a power regulator or a secondary regulator.

As shown in FIG. 4, the inputs of the NPC boost power factor correction converter 102 are connected to an AC power source VIN. The NPC boost power factor correction converter 102 converts an AC input voltage into three DC voltage buses, namely VB1, VB2 and VB3 as shown in FIG. 4. A first capacitor C1 is connected between voltage buses VB1 and VB3. A second capacitor C2 is connected between voltage buses VB3 and VB2. The first capacitor C1 and second capacitor C2 are employed to reduce the ripple components and provide steady DC voltages for the three-level LLC resonant converter 104.

As shown in FIG. 4, the NPC boost power factor correction converter 102 comprises an inductor L1, six switches S1-S6 and four diodes D1-D4. The switches S1 and S2 are connected in series between the voltage buses VB1 and VB2. The switches S3, S4, S5 and S6 are connected in series between the voltage buses VB1 and VB2. A first output terminal of the AC power source VIN is connected to a common node of switches S1 and S2. The inductor L1 is connected between a second output terminal of the AC power source VIN and a common node of switches S4 and S5. The diodes D1 and D2 are connected in parallel with switches S1 and S2 respectively. The diodes D3 and D4 are connected in series between a common node of switches S3 and S4, and a common node of switches S5 and S6. The common node of diodes D3 and D4 is connected to the voltage bus VB3. The operating principle of the NPC boost power factor correction converter is well known, and hence is not discussed herein.

The three-level LLC resonant converter 104 is connected between the outputs of the NPC boost power factor correction converter 102 and a primary winding NP of the transformer 191. The three-level LLC resonant converter 104 comprises a switch network and a resonant tank. As shown in FIG. 4, the switch network, the resonant tank and the primary winding NP of the transformer 191 are connected in cascade.

The switch network comprises switches S7, S8, S9 and S10 connected in series between the voltage buses VB1 and VB2. The common node of switches S8 and S9 is connected to the common node of the capacitors C1 and C2. The common node of switches S7 and S8 is connected to a first terminal of the transformer 191 through the resonant tank comprising Lr and Cr. The common node of switches S8 and S9 is connected to a second terminal of the transformer 191.

The resonant tank may be implemented in a variety of ways. For example, the resonant tank comprises a series resonant inductor Lr, a parallel resonant inductor Lm and a series resonant capacitor Cr.

The series resonant inductor and the parallel resonant inductor may be implemented as external inductors. A person skilled in the art will recognize that there may be many variations, alternatives and modifications. For example, the series resonant inductor may be implemented as a leakage inductance of the transformer 191.

In sum, the resonant tank includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank, the resonant tank helps to achieve zero voltage switching for the primary side switching elements and zero current switching for the secondary side switching elements.

The transformer 191 may be formed of four transformer windings, namely a primary transformer winding NP and three secondary transformer windings NS11, NS12 and NS2 as shown in FIG. 4. A first rectifier comprising switches S11-S14 is connected to first secondary winding NS11 through a first secondary capacitor CS1. A second rectifier comprising switch S24 and diodes D21-D23 is connected to second secondary winding NS12 through a second secondary capacitor CS2. The secondary capacitors CS1 and CS2 are employed to achieve a voltage doubler function. For example, when the switch S24 is configured as an always-on switch, the second rectifier is configured as a voltage doubler. More particularly, the second rectifier charges the secondary capacitor CS2 from the input voltage generated by the secondary winding NS12. The input voltage and the voltage across the secondary capacitor CS2 are added together. As a result having the input voltage and the voltage across the secondary capacitor CS2 added together, the output voltage of the second rectifier is about twice the input voltage.

It should be noted when the second rectifier is configured as a voltage doubler, the first rectifier should be configured as a voltage doubler too. In other words, the switch S14 is configured as an always-on switch when the switch S24 is configured as an always-on switch.

As shown in FIG. 4, the outputs of the first rectifier and the outputs of the second rectifier are connected in parallel. An output capacitor Co1 is connected to the outputs of the first rectifier. The parallel-connected first rectifier and second rectifier are employed to provide a DC voltage for a first load RL1. In some embodiments, the first load RL1 is a main battery of an electric vehicle. The main battery may be a lithium-ion polymer battery. The rated voltage of the main battery is about 360 V. The power of the main battery is about 100 kW.

In operation, the first load RL1 can be configured as either a DC load or a DC power source. In some embodiments, the power flowing into the first load RL1 (RL1 as a DC load) is much higher than the power flowing out of the first load RL1 (RL1 as a DC power source). For example, the power flowing into the first load RL1 is about 100 kW. The power flowing out of the first load RL1 is about 10 kW.

During the process of having power flowing out of the first load RL1, the first rectifier comprising switches S11-S14 functions a full-bridge circuit, and the second rectifier comprising diodes D21-D23 and S24 is disabled. During the process of having power flowing into the first load RL1, the first rectifier and the second rectifier are connected in parallel to provide power for the first load RL1. As such, the power rating of the first rectifier may be one ninth of the power rating of the second rectifier. For example, the first rectifier may be of a power rating of 10 kW. The second rectifier may be of a power rating of 90 kW. During the process of having power flowing into the first load RL1, the parallel connected first rectifier and second rectifier can provide power of 100 kW. On the other hand, during the process of having power flowing out of the first load RL1, the first rectifier is able to provide power of 10 kW. One advantageous feature of a low-power rectifier (e.g., the first rectifier) shown in FIG. 4 is transferring power through two rectifiers unevenly which helps to reduce the power rating of one rectifier, thereby achieving a cost-effective solution.

A third rectifier comprising switches S31-S34 is connected to the third secondary winding NS2 through a third secondary capacitor CS3. As described above, the third rectifier can be configured as a voltage doubler by configuring the switch S34 as an always-on switch.

The power regulator 142 is implemented as a buck DC/DC converter as shown in FIG. 4. The duty cycle of the buck DC/DC converter can be adjusted so as to regulate the output voltage applied to a second load RL2. The power regulator 142 comprises switches S41 and S42 connected in series between the output of the third rectifier and ground. An inductor L2 is connected to a common node of switches S41 and S42. An output capacitor Co3 is connected in parallel with the second load RL2. In some embodiments, the second load RL2 is an auxiliary battery of an electric vehicle. The auxiliary battery may be a lithium-ion polymer battery and the rated voltage of the auxiliary battery is about 12 V.

According to some embodiments, switches S3-S10, S11-S14, S24, S31-S34 and S41-S42 shown in FIG. 4 are implemented as MOSFET or MOSFETs connected in parallel, any combinations thereof and/or the like. According to alternative embodiments, S3-S10, S11-S14, S24, S31-S34 and S41-S42 may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and/or the like.

It should further be noted that while FIG. 4 illustrates switches S3-S10, S11-S14, S24, S31-S34 and S41-S42 follow standard switch configurations, various embodiments of the present disclosure may include other variations, modifications and alternatives. For example, a separate capacitor may be connected in parallel with each switch. Such a separate capacitor helps to better control the timing of the resonant process of the LLC resonant converter.

In accordance with an embodiment, the switches S1 and S2 shown in FIG. 4 may be an IGBT device. Alternatively, the switching element can be any controllable switches such as MOSFET devices, IGCT devices, GTO devices, SCR devices, JFET devices, MCT devices and the like.

It should be noted that when the switches shown in FIG. 4 are implemented as MOSFET devices, the body diodes of switches can be used to provide a freewheeling channel. On the other hand, when the switches are implemented as IGBT devices, a separate freewheeling diode is required to be connected in parallel with its corresponding switch.

As shown in FIG. 4, diodes D1 and D2 are required to provide reverse conducting paths. In other words, diodes D1 and D2 are anti-parallel diodes. In some embodiments, diodes D1 and D2 are co-packaged with their respective IGBT devices. In alternative embodiments, didoes D1 and D2 are placed outside their respective IGBT devices.

It should further be noted that while FIG. 4 shows each bidirectional switch (e.g., switches S1 and S2) is formed by diodes and IGBT devices connected in an anti-parallel arrangement, one of ordinary skill in the art would recognize many variations, alternatives and modifications. For example, the bidirectional switch may be implemented by some new semiconductor switches such as anti-paralleled reverse blocking IGBTs arrangement. The discussion of the IGBT devices herein is applicable to other IGBT devices of this disclosure.

Figure 5:
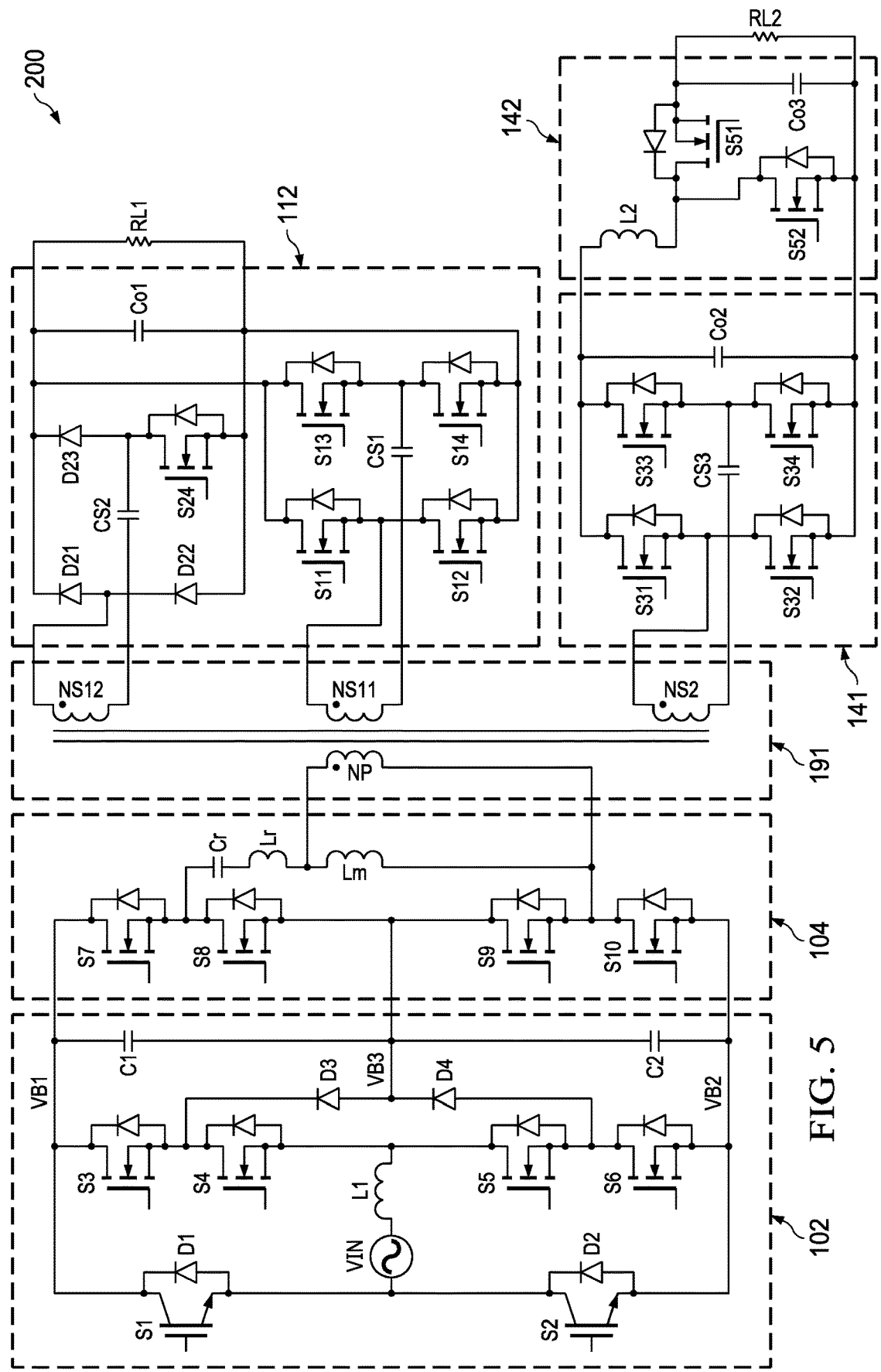
FIG. 5 illustrates a schematic diagram of a second implementation of the bidirectional three-port power conversion system shown in FIG. 3 in accordance with various embodiments of the present disclosure.

FIG. 5 illustrates a schematic diagram of a second implementation of the bidirectional three-port power conversion system shown in FIG. 3 in accordance with various embodiments of the present disclosure. The bidirectional three-port power conversion system 200 shown in FIG. 5 is similar to that shown in FIG. 4 except that the power regulator 142 is implemented as a boost DC/DC converter. As shown in FIG. 5, switches S51 and S52 are connected in series between the output of the power regulator 142 and ground. The inductor L2 is connected to the output of the first network 141, and a common node of switches S51 and S52.

Figure 6:
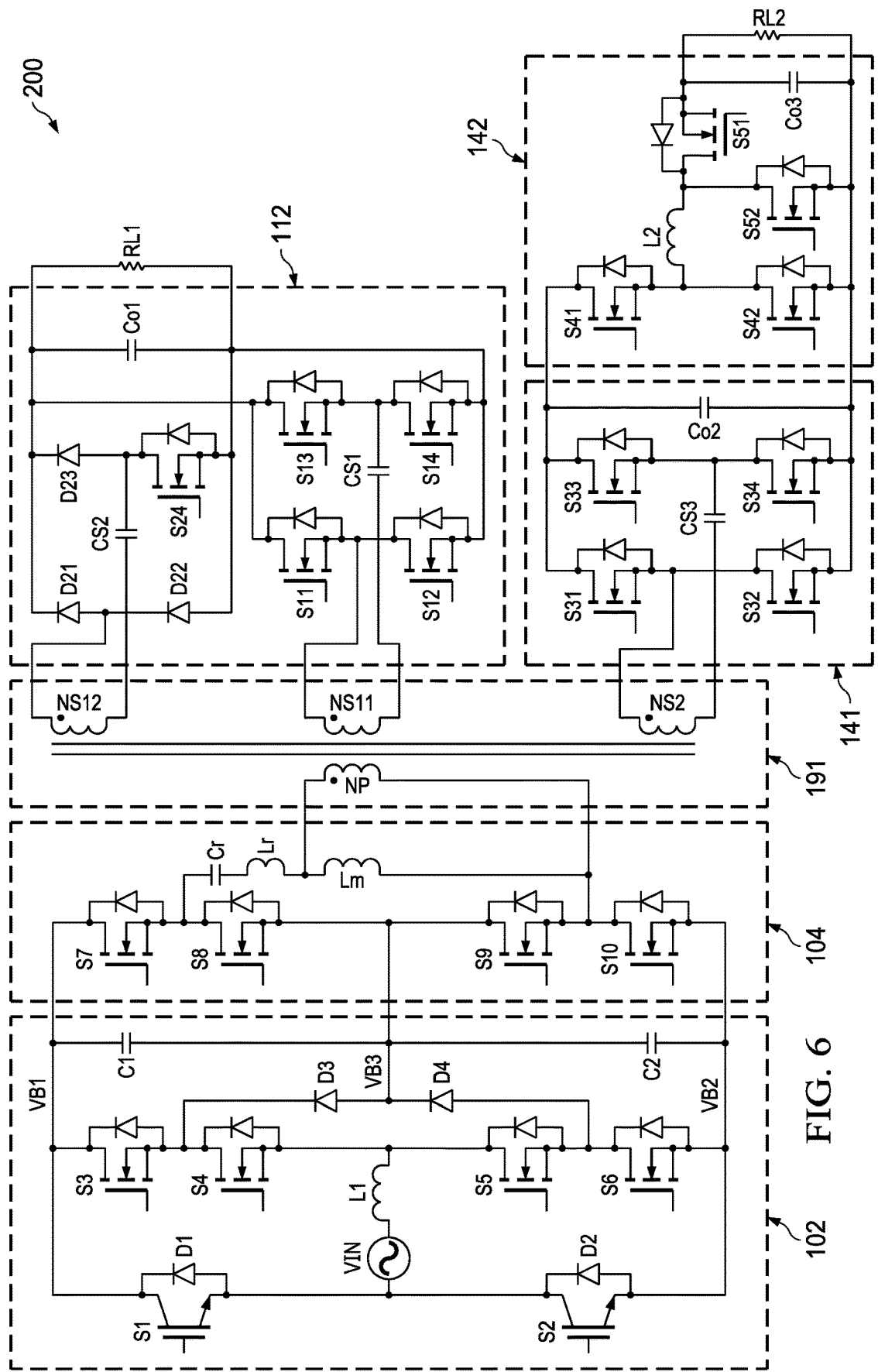
FIG. 6 illustrates a schematic diagram of a third implementation of the bidirectional three-port power conversion system shown in FIG. 3 in accordance with various embodiments of the present disclosure.

FIG. 6 illustrates a schematic diagram of a third implementation of the bidirectional three-port power conversion system shown in FIG. 3 in accordance with various embodiments of the present disclosure. The bidirectional three-port power conversion system 200 shown in FIG. 6 is similar to that shown in FIG. 4 except that the power regulator 142 is implemented as a buck-boost DC/DC converter.

As shown in FIG. 6, switches S41 and S42 are connected in series between the output of the first network 141 and ground. Switches S51 and S52 are connected in series between the output of the power regulator 142 and ground. The inductor L2 is connected to a common node of switches S41 and S42, and a common node of switches S51 and S52.

One advantageous feature of having a buck-boost DC/DC converter shown in FIG. 6 is the bidirectional three-port power conversion system 200 is able to regulate the output voltage applied to the second load RL2 under various load conditions. Furthermore, when the second load RL2 is configured as a DC power source to provide power for other DC loads and/or the AC load, the buck-boost DC/DC converter helps to regulate the voltage across the capacitor Cot over the full battery voltage range of the DC power source.

Figure 7:
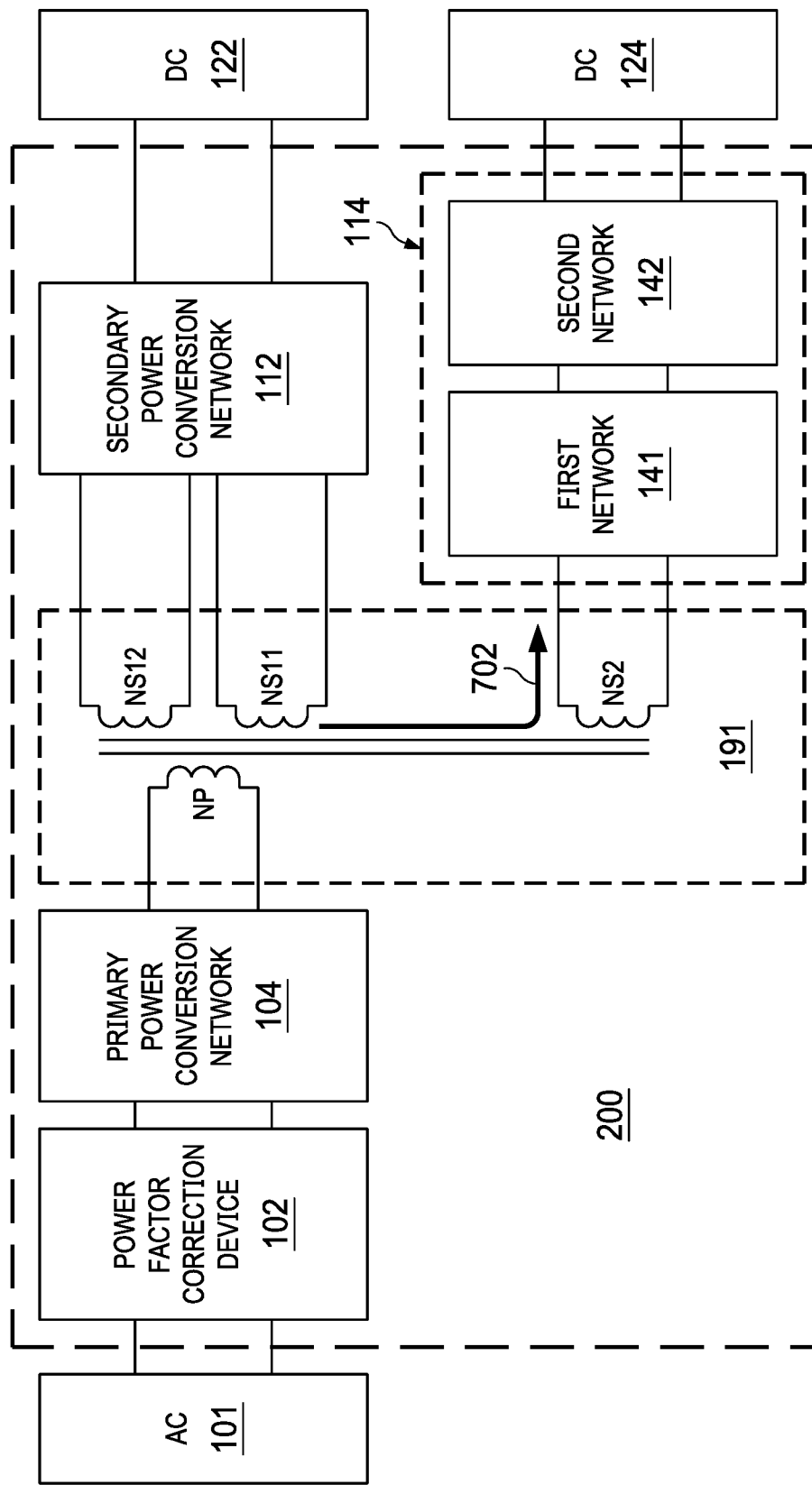
FIG. 7 illustrates a block diagram of the bidirectional three-port power conversion system shown in FIG. 3 after the first DC load of the bidirectional three-port power conversion system is configured as a power source to provide power for the second DC load in accordance with various embodiments of the present disclosure.

FIG. 7 illustrates a block diagram of the bidirectional three-port power conversion system shown in FIG. 3 after the first DC load of the bidirectional three-port power conversion system is configured as a power source to provide power for the second DC load in accordance with various embodiments of the present disclosure. In some embodiments, the AC power source may be disconnected from the bidirectional three-port power conversion system 200. The DC element 122 is a battery, which has been fully charged. The DC element 124 is implemented as a DC load.

In response to this system configuration change, the DC element 122 may be configured as a DC power source. As indicated by the curved arrow 702, the power is transferred from the DC power source 122 to the DC load 124 through the secondary power conversion network 112, the first network 141 and the second network 142. Referring back to FIG. 4, the first rectifier (S11-S14) of the secondary power conversion network 112 functions as a full-bridge converter converting the DC voltage into an alternating polarity waveform. The alternating polarity waveform is fed into the first network 141 through the magnetic coupling between secondary windings NS11 and NS2. The first network 141 functions as a rectifier converting the alternating polarity waveform into a single polarity waveform. The single polarity waveform is a DC voltage, which is applied to the DC load through the power regulator 142.

Figure 8:
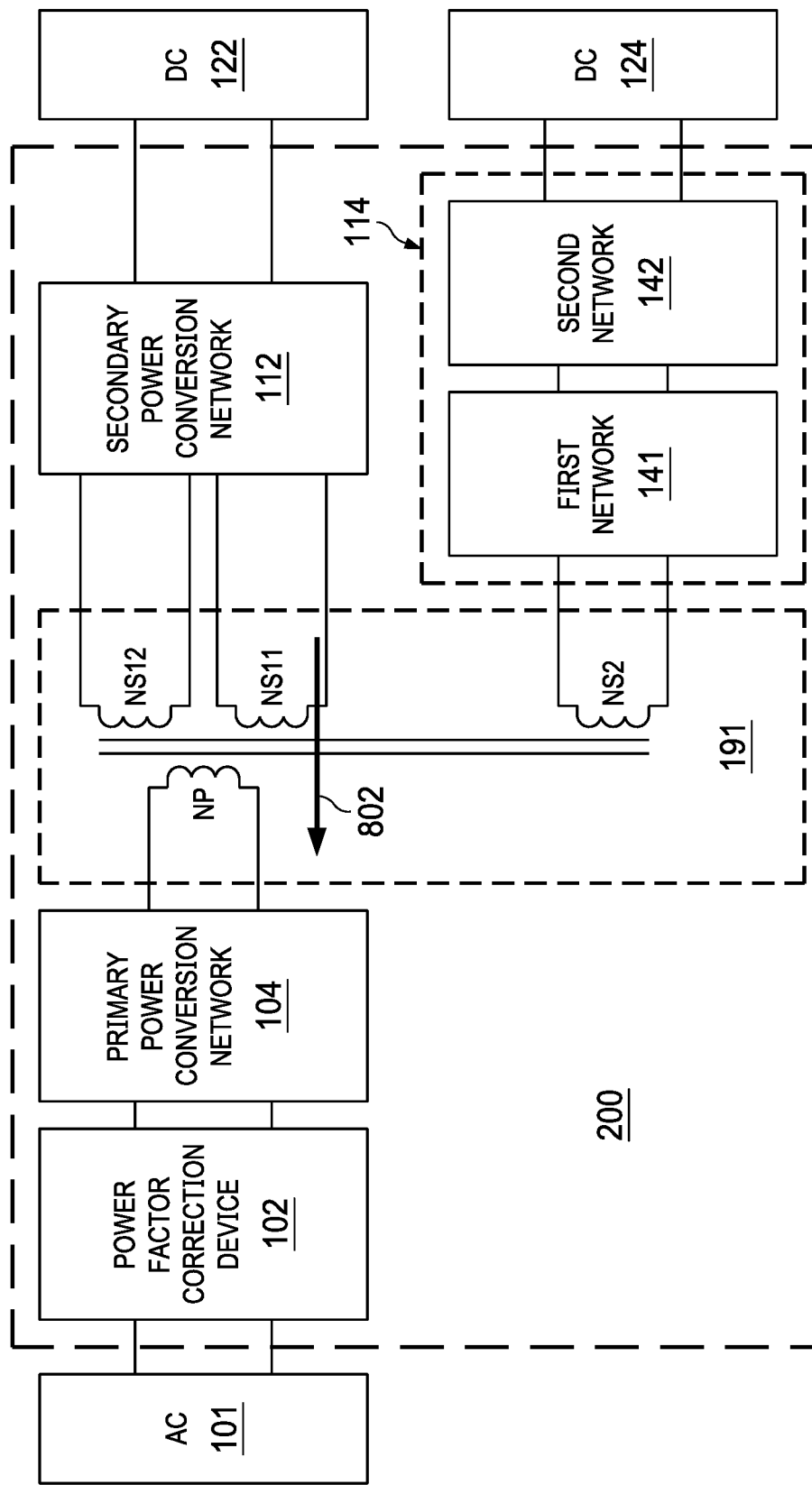
FIG. 8 illustrates a block diagram of the bidirectional three-port power conversion system shown in FIG. 3 after the first DC load of the bidirectional three-port power conversion system is configured as a power source to provide power for an AC load in accordance with various embodiments of the present disclosure.

FIG. 8 illustrates a block diagram of the bidirectional three-port power conversion system shown in FIG. 3 after the first DC load of the bidirectional three-port power conversion system is configured as a power source to provide power for an AC load in accordance with various embodiments of the present disclosure. In some embodiments, the AC power source may be disconnected from the bidirectional three-port power conversion system 200. The AC element 101 is implemented as an AC load.

In response to this system configuration change, the first DC load 122 may be configured as a DC power source. As indicated by the curved arrow 802, the power is transferred from the DC power source 122 to the AC load 101 through the secondary power conversion network 112, the primary power conversion network 104 and the power factor correction device 102. Referring back to FIG. 4, the first rectifier (S11-S14) of the secondary power conversion network 112 functions as a full-bridge converter converting the DC voltage into an alternating polarity waveform. The alternating polarity waveform is fed into the primary power conversion network 104 through the magnetic coupling between windings NS11 and NP. The primary power conversion network 104 functions as a rectifier converting the alternating polarity waveform into a single polarity waveform, which is fed into the power factor correction device 102. The power factor correction device 102 is configured as an inverter, through which the single polarity waveform is converted into an AC waveform, which is applied to the AC load 101.

Figure 9:
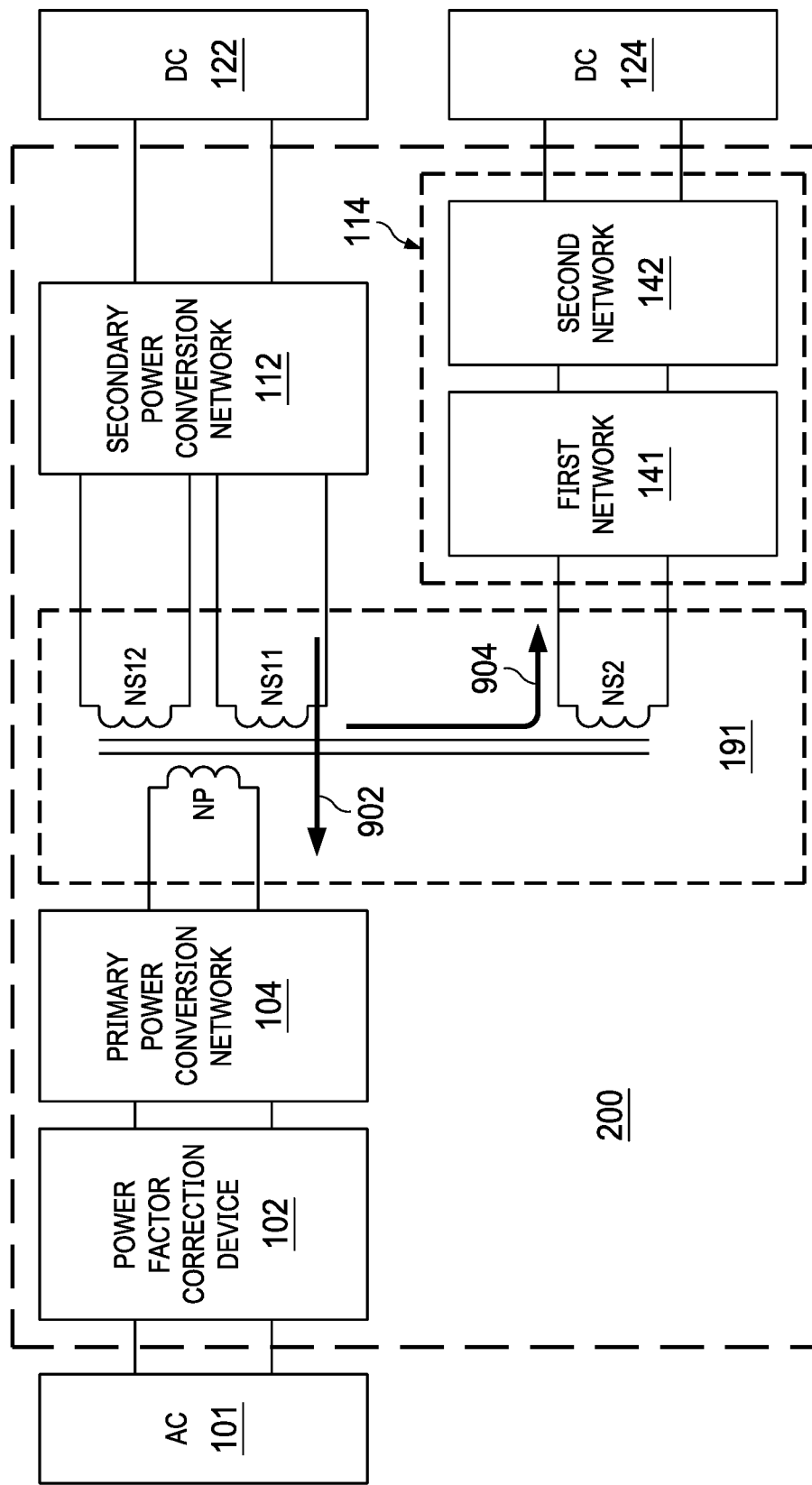
FIG. 9 illustrates a block diagram of the bidirectional three-port power conversion system shown in FIG. 3 after the first DC load of the bidirectional three-port power conversion system is configured as a power source to provide power for the second DC load and an AC load in accordance with various embodiments of the present disclosure.

FIG. 9 illustrates a block diagram of the bidirectional three-port power conversion system shown in FIG. 3 after the first DC load of the bidirectional three-port power conversion system is configured as a power source to provide power for the second DC load and an AC load in accordance with various embodiments of the present disclosure. In some embodiments, the AC power source may be disconnected from the bidirectional three-port power conversion system 200. The AC element 101 is implemented as an AC load. The DC element 124 is implemented as a DC load.

In response to this system configuration change, the first DC load 122 may be configured as a DC power source. As indicated by the curved arrow 902, the power is transferred from the DC power source 122 to the AC load 101 through the secondary power conversion network 112, the primary power conversion network 104 and the power factor correction device 102. At the same time, as indicated by the curved arrow 904, the power is transferred from the DC power source 122 to the DC load 124 through the secondary power conversion network 112, the first network 141 and the second network 142.

Referring back to FIG. 4, the first rectifier (S11-S14) of the secondary power conversion network 112 functions as a full-bridge converter converting the DC voltage of the DC power source 122 into an alternating polarity waveform. The alternating polarity waveform is fed into the primary power conversion network 104 through the magnetic coupling between NS11 and NP, and fed into the first network 141 through the magnetic coupling between NS11 and NS2. The primary power conversion network 104 functions as a rectifier converting the alternating polarity waveform into a single polarity waveform. The power factor correction device 102 is configured as an inverter, through which the single polarity waveform is converted into an AC waveform, which is applied to the AC load 101. Similarly, the first network 141 functions as a rectifier converting the alternating polarity waveform into a single polarity waveform. The single polarity waveform is a DC voltage, which is applied to the DC load through the power regulator 142.

Figure 10:
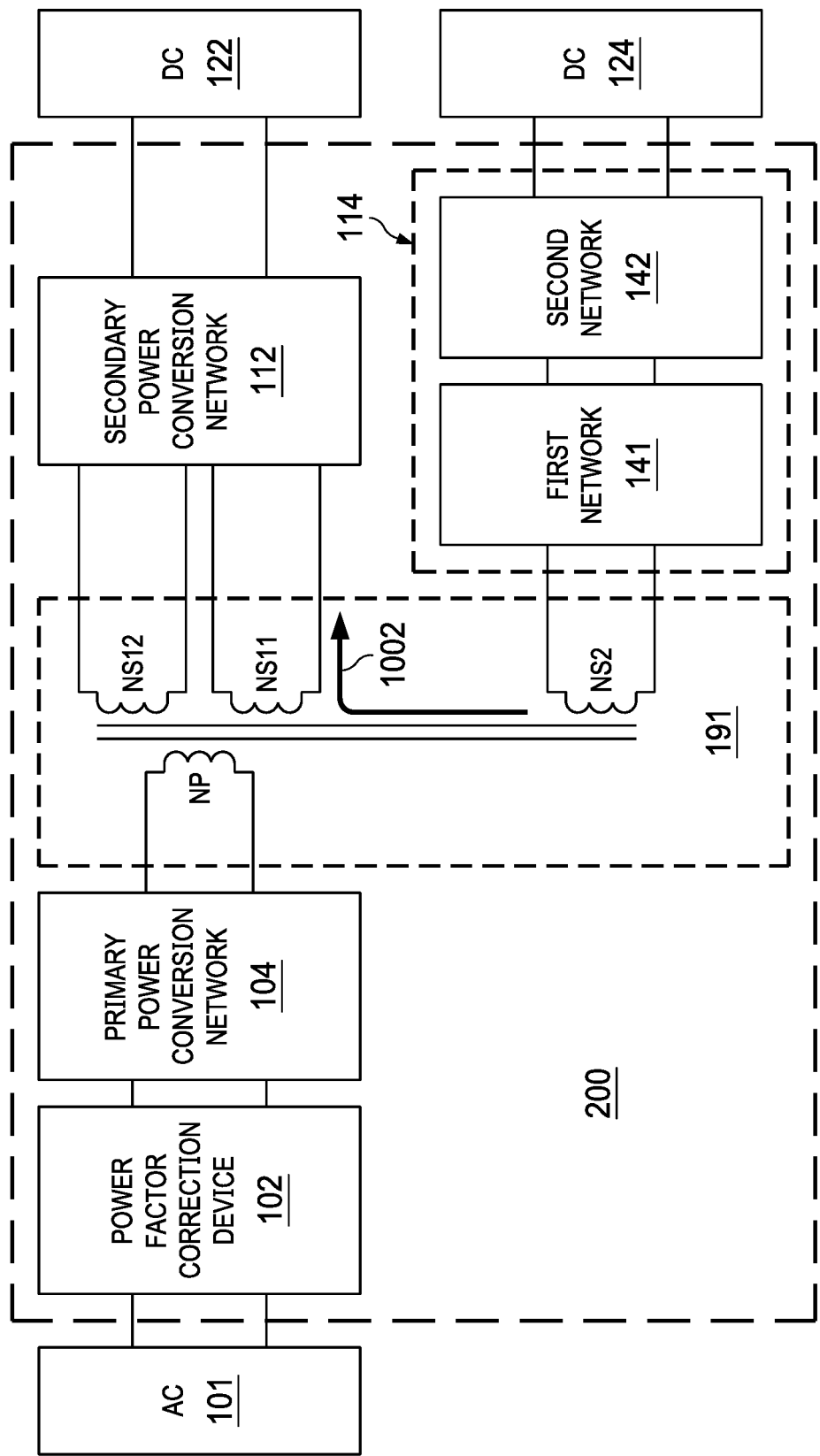
FIG. 10 illustrates a block diagram of the bidirectional three-port power conversion system shown in FIG. 3 after the second DC load of the bidirectional three-port power conversion system is configured as a power source to provide power for the first DC load in accordance with various embodiments of the present disclosure.

FIG. 10 illustrates a block diagram of the bidirectional three-port power conversion system shown in FIG. 3 after the second DC load of the bidirectional three-port power conversion system is configured as a power source to provide power for the first DC load in accordance with various embodiments of the present disclosure. In some embodiments, the AC power source may be disconnected from the bidirectional three-port power conversion system 200. The DC element 124 is a battery, which has been fully charged. The DC element 122 is implemented as a DC load.

In response to this system configuration change, the DC element 124 may be configured as a DC power source. As indicated by the curved arrow 1002, the power is transferred from the DC power source 124 to the DC load 122 through the second network 142, the first network 141 and the secondary power conversion network 112. Referring back to FIG. 4, the second network 142 is configured as a boost DC/DC converter. The first network 141 functions as a full-bridge converter converting the DC voltage generated by the boost DC/DC converter into an alternating polarity waveform. The alternating polarity waveform is fed into the secondary power conversion network 112 through the magnetic coupling between NS2 and NS11/NS12. The secondary power conversion network 112 functions as a rectifier converting the alternating polarity waveform into a single polarity waveform. The single polarity waveform is a DC voltage, which is applied to the DC load 122.

Figure 11:
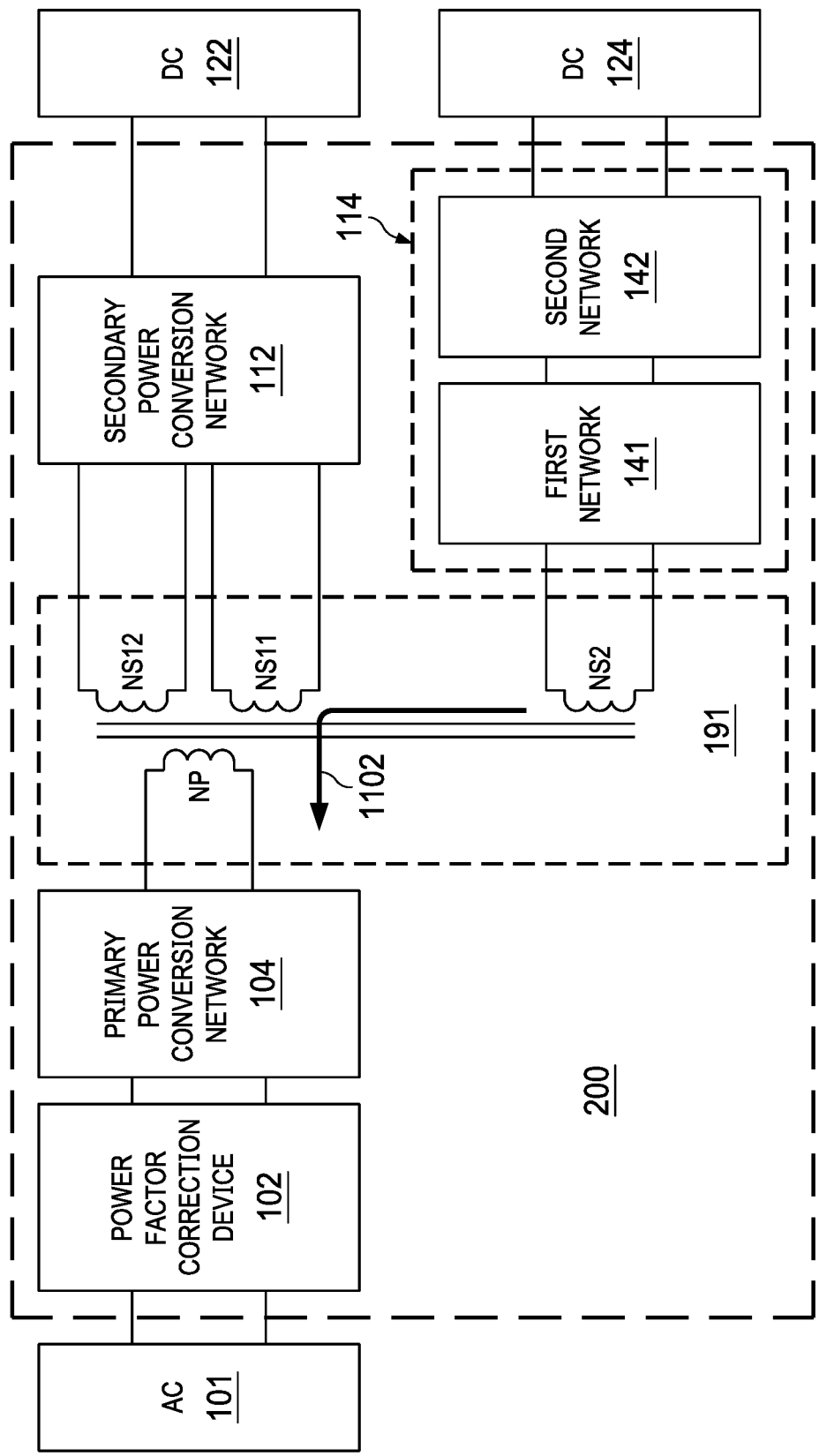
FIG. 11 illustrates a block diagram of the bidirectional three-port power conversion system shown in FIG. 3 after the second DC load of the bidirectional three-port power conversion system is configured as a power source to provide power for an AC load in accordance with various embodiments of the present disclosure.

FIG. 11 illustrates a block diagram of the bidirectional three-port power conversion system shown in FIG. 3 after the second DC load of the bidirectional three-port power conversion system is configured as a power source to provide power for an AC load in accordance with various embodiments of the present disclosure. In some embodiments, the AC power source may be disconnected from the bidirectional three-port power conversion system 200. The AC element 101 is implemented as an AC load.

In response to this system configuration change, the DC element 124 may be configured as a DC power source. As indicated by the curved arrow 1102, the power is transferred from the DC power source 124 to the AC load 101 through the second network 142, the first network 141, the primary power conversion network 104 and the power factor correction device 102. Referring back to FIG. 4, the second network 142 is configured as a boost DC/DC converter. The first network 141 functions as a full-bridge converter converting the DC voltage generated by the boost DC/DC converter into an alternating polarity waveform. The alternating polarity waveform is fed into the primary power conversion network 104 through the magnetic coupling between NS2 and NP. The primary power conversion network 104 functions as a rectifier converting the alternating polarity waveform into a single polarity waveform. The power factor correction device 102 is configured as an inverter, through which the single polarity waveform is converted into an AC waveform, which is applied to the AC load 101.

Figure 12:
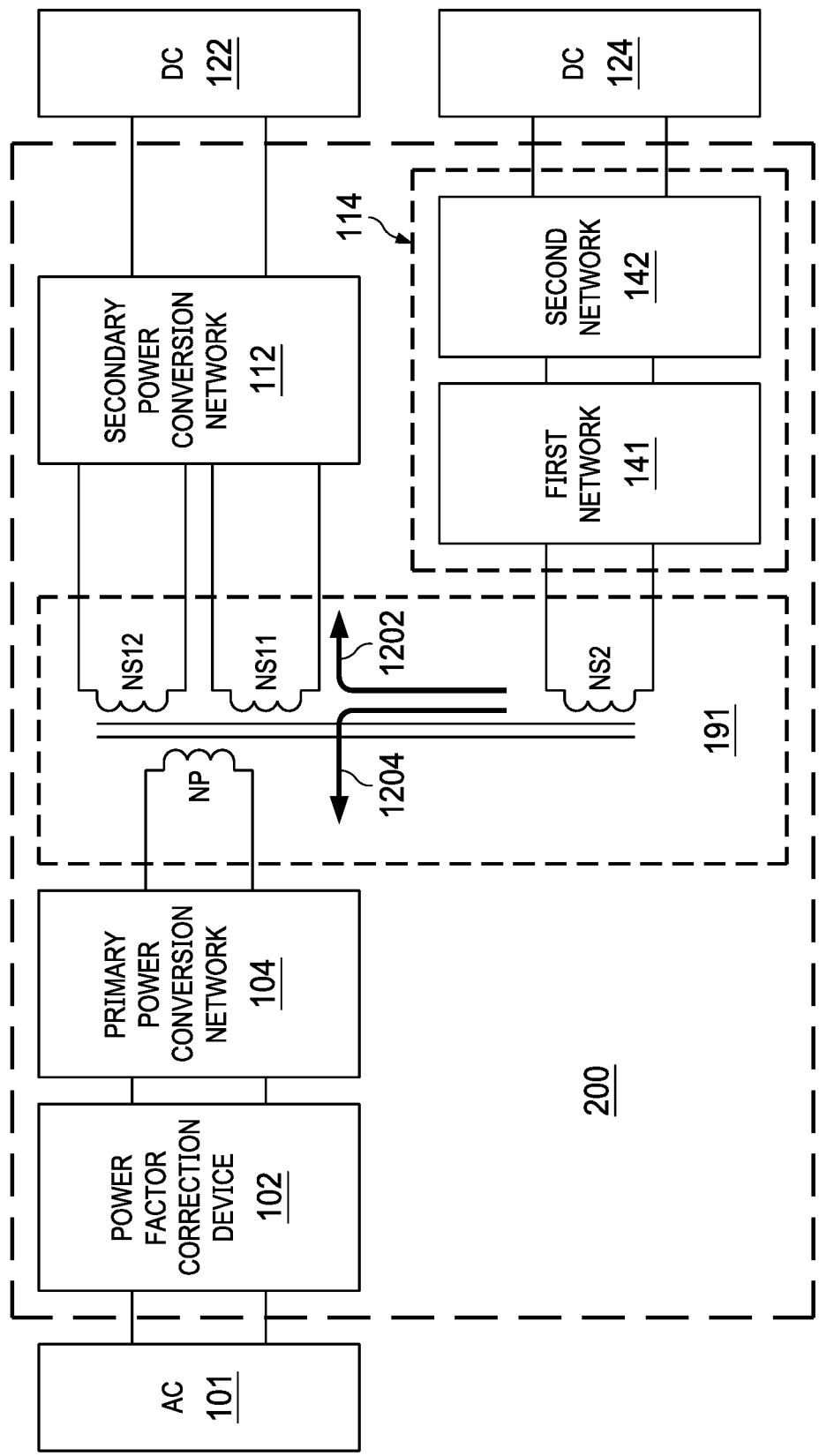
FIG. 12 illustrates a block diagram of the bidirectional three-port power conversion system shown in FIG. 3 after the second DC load of the bidirectional three-port power conversion system is configured as a power source to provide power for both the first DC load and an AC load in accordance with various embodiments of the present disclosure.

FIG. 12 illustrates a block diagram of the bidirectional three-port power conversion system shown in FIG. 3 after the second DC load of the bidirectional three-port power conversion system is configured as a power source to provide power for both the first DC load and an AC load in accordance with various embodiments of the present disclosure. In some embodiments, the AC power source may be disconnected from the bidirectional three-port power conversion system 200. The AC element 101 is implemented as an AC load. The DC element 124 is a battery, which has been fully charged. The DC element 122 is implemented as a DC load.

In response to this system configuration change, the DC element 124 may be configured as a DC power source. As indicated by the curved arrow 1204, the power is transferred from the DC power source 124 to the AC load 101 through the second network 142, the first network 141, the primary power conversion network 104 and the power factor correction device 102. Likewise, as indicated by the curved arrow 1202, the power is transferred from the DC power source 124 to the DC load 122 through the second network 142, the first network 141 and the secondary power conversion network 112.

Referring back to FIG. 4, the second network 142 is configured as a boost DC/DC converter. The first network 141 functions as a full-bridge converter converting the DC voltage generated by the boost DC/DC converter into an alternating polarity waveform. The alternating polarity waveform is fed into the primary power conversion network 104 through the magnetic coupling between NS2 and NP. The primary power conversion network 104 functions as a rectifier converting the alternating polarity waveform into a single polarity waveform. The power factor correction device 102 is configured as an inverter, through which the single polarity waveform is converted into an AC waveform, which is applied to the AC load 101. Furthermore, the alternating polarity waveform generated by the first network 141 is fed into the secondary power conversion network 112 through the magnetic coupling between NS2 and NS11/NS12. The secondary power conversion network 112 functions as a rectifier converting the alternating polarity waveform into a single polarity waveform. The single polarity waveform is a DC voltage, which is applied to the DC load 122.

Figure 13:
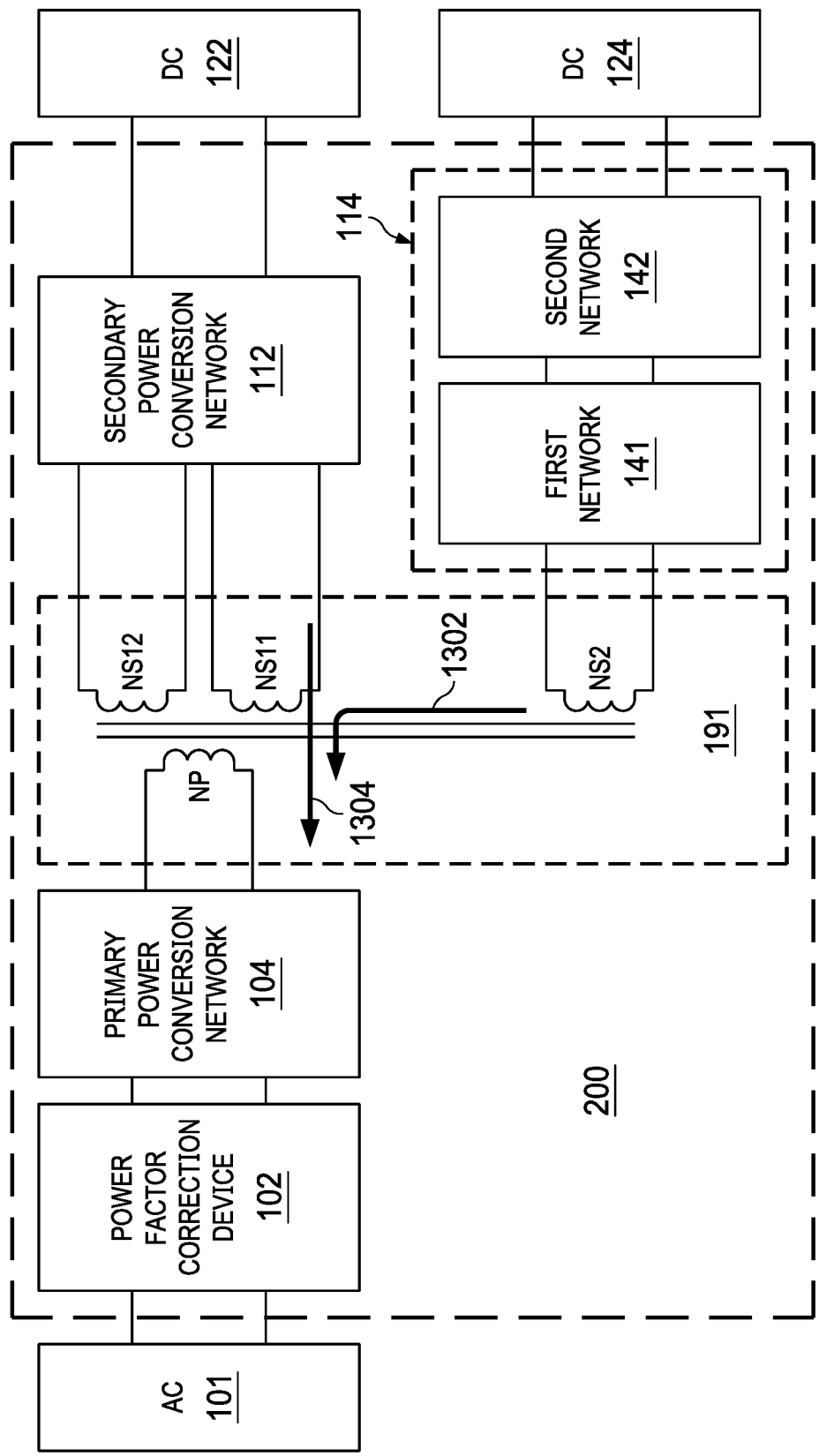
FIG. 13 illustrates a block diagram of the bidirectional three-port power conversion system after both the first DC load and the second DC load of the bidirectional three-port power conversion system are configured as power sources to provide power for an AC load in accordance with various embodiments of the present disclosure.

FIG. 13 illustrates a block diagram of the bidirectional three-port power conversion system after both the first DC load and the second DC load of the bidirectional three-port power conversion system are configured as power sources to provide power for an AC load in accordance with various embodiments of the present disclosure. In some embodiments, the AC power source may be disconnected from the bidirectional three-port power conversion system 200. The AC element 101 is implemented as an AC load. Both the DC element 122 and DC element 124 are batteries, which have been fully charged.

In response to this system configuration change, both the DC element 122 and the DC element 124 may be configured as DC power sources. As indicated by the curved arrows 1302 and 1304, the power is transferred from the DC power sources 122 and 124 to the AC load 101. The power transferring path from the DC power source 122 to the AC load 101 has been described above with respect to FIG. 8, and hence is not discussed again herein. Likewise, the power transferring path from the DC power source 124 to the AC load 101 has been described above with respect to FIG. 11, and hence is not discussed again herein. In some embodiments, the DC power sources 122 and 124 may transfer power to the AC load 101 simultaneously. In alternative embodiments, the DC power sources 122 and 124 may transfer power to the AC load 101 in an alternating manner.

Figure 14:
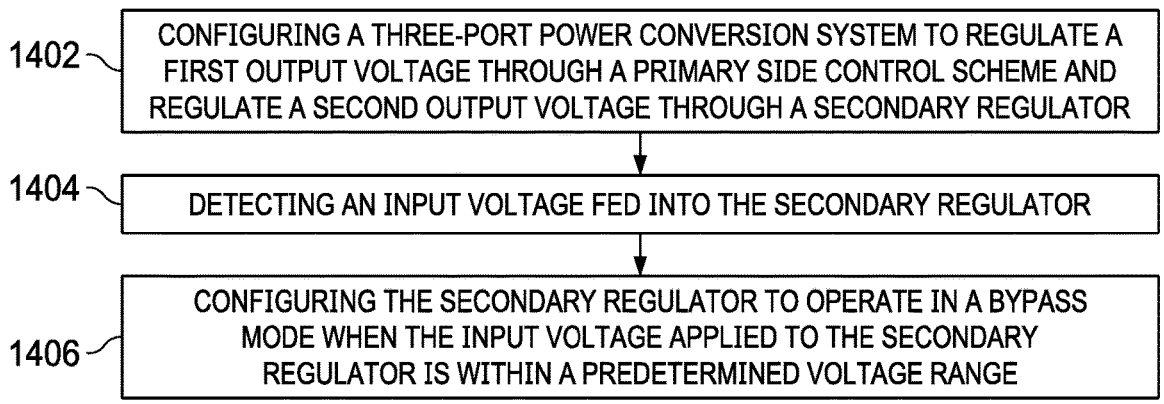
FIG. 14 illustrates a flow chart of a method for controlling the bidirectional three-port power conversion system shown in FIG. 3 in accordance with various embodiments of the present disclosure.

FIG. 14 illustrates a flow chart of a method for controlling the bidirectional three-port power conversion system shown in FIG. 3 in accordance with various embodiments of the present disclosure. This flowchart shown in FIG. 14 is merely an example, which should not unduly limit the scope of the claims. One of ordinary skill in the art would recognize many variations, alternatives, and modifications. For example, various steps illustrated in FIG. 14 may be added, removed, replaced, rearranged and repeated.

A bidirectional three-port power conversion system comprises a power factor correction device and an isolated power converter having three ports. A first port is connected to the power factor correction device through a primary power conversion network. The primary power conversion network may be implemented as a three-level LLC power converter. A second port is connected to a first DC load through a secondary power converter network. The secondary power converter network functions as a rectifier. A third port is connected to a second DC load through a first network and a second network. The first network is implemented as a rectifier. The second network is implemented as a power regulator such as a buck DC/DC converter.

In operation, the voltage applied to the first DC load is regulated mainly through adjusting the output voltage of the power factor correction device in a wide range and partially through adjusting the switching frequency of the three-level LLC converter in a narrow range. It should be noted that the regulation of the LLC resonant converter may be achieved through a variety of control methods such as PWM control mechanisms, phase modulation control mechanisms and/or frequency modulation control mechanisms. The control mechanisms of LLC resonant converters above are well known in the art, and hence are not discussed in detail herein to avoid unnecessary repetition.

At step 1402, the three-port power conversion system is employed to convert an AC voltage from a single-phase AC source into a first DC voltage for a first DC load and a second DC voltage for a second DC load. In some embodiments, the first DC load is a main battery of an electric vehicle. The second DC load is an auxiliary battery of the electric vehicle. The primary side of the three-port power conversion system comprises a power factor correction device and an LLC resonant converter. The first DC load is connected to the secondary side of the three-port power conversion system through a first rectifier apparatus. The second DC load is connected to the secondary side of the three-port power conversion system through a second rectifier apparatus and a secondary regulator. The secondary regulator is implemented as a buck DC/DC converter.

In operation, the first DC voltage is regulated mainly through regulating the output voltage of the power factor correction device and partially through adjusting the LLC resonant converter in a narrow range. The second DC voltage is regulated through adjusting the duty cycle of the secondary regulator.

At step 1404, a suitable voltage sensor detects an input voltage fed into the secondary regulator. A controller is employed to compare the detected input voltage with a predetermined voltage range.

At step 1406, the secondary regulator is configured to operate in a bypass mode when the input voltage applied to the secondary regulator is within the predetermined voltage range. In the bypass mode, the high-side switch of the secondary regulator is configured as an always-on switch. The low-side switch of the secondary regulator is configured as an always-off switch. One advantageous feature of having the bypass mode is the switching losses of the secondary regulator can be saved, thereby improving the efficiency of the three-port power conversion system.

Figure 15:
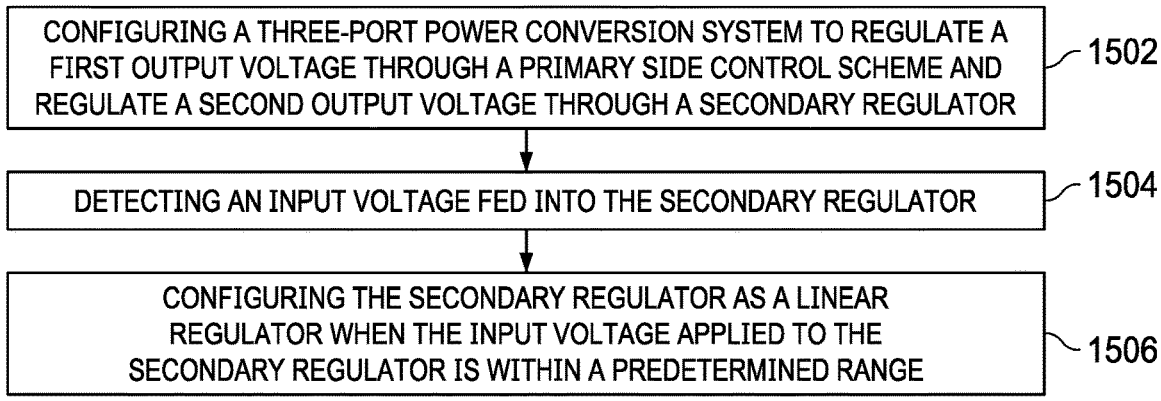
FIG. 15 illustrates a flow chart of another method for controlling the bidirectional three-port power conversion system shown in FIG. 3 in accordance with various embodiments of the present disclosure.

FIG. 15 illustrates a flow chart of another method for controlling the bidirectional three-port power conversion system shown in FIG. 3 in accordance with various embodiments of the present disclosure. This flowchart shown in FIG. 15 is merely an example, which should not unduly limit the scope of the claims. One of ordinary skill in the art would recognize many variations, alternatives, and modifications. For example, various steps illustrated in FIG. 15 may be added, removed, replaced, rearranged and repeated.

At step 1502, a three-port power conversion system is employed to convert an AC voltage from a single-phase AC source into a first DC voltage for a first DC load and a second DC voltage for a second DC load. In some embodiments, the first DC load is a main battery of an electric vehicle. The second DC load is an auxiliary battery of the electric vehicle. The primary side of the three-port power conversion system comprises a power factor correction device and an LLC resonant converter. The first DC load is connected to the secondary side of the three-port power conversion system through a first rectifier apparatus. The second DC load is connected to the secondary side of the three-port power conversion system through a second rectifier apparatus and a secondary regulator. The secondary regulator is implemented as a buck DC/DC converter.

In operation, the first DC voltage is regulated mainly through regulating the output voltage of the power factor correction device and partially through adjusting the LLC resonant converter in a narrow range. The second DC voltage is regulated through adjusting the duty cycle of the secondary regulator.

At step 1504, a suitable voltage sensor detects an input voltage fed into the secondary regulator. A controller is employed to compare the detected input voltage with a predetermined voltage range.

At step 1506, the secondary regulator is configured as a linear regulator when the input voltage applied to the secondary regulator is within the predetermined voltage range. As a linear regulator, the output voltage of the linear regulator is regulated through controlling the voltage drop across the high-side switch of the secondary regulator. The low-side switch of the secondary regulator is configured as an always-off switch. One advantageous feature of configuring the secondary regulator as a linear regulator is the secondary regulator is able to generate a noise-free voltage suitable for DC loads sensitive to power supply noise.

Figure 16:
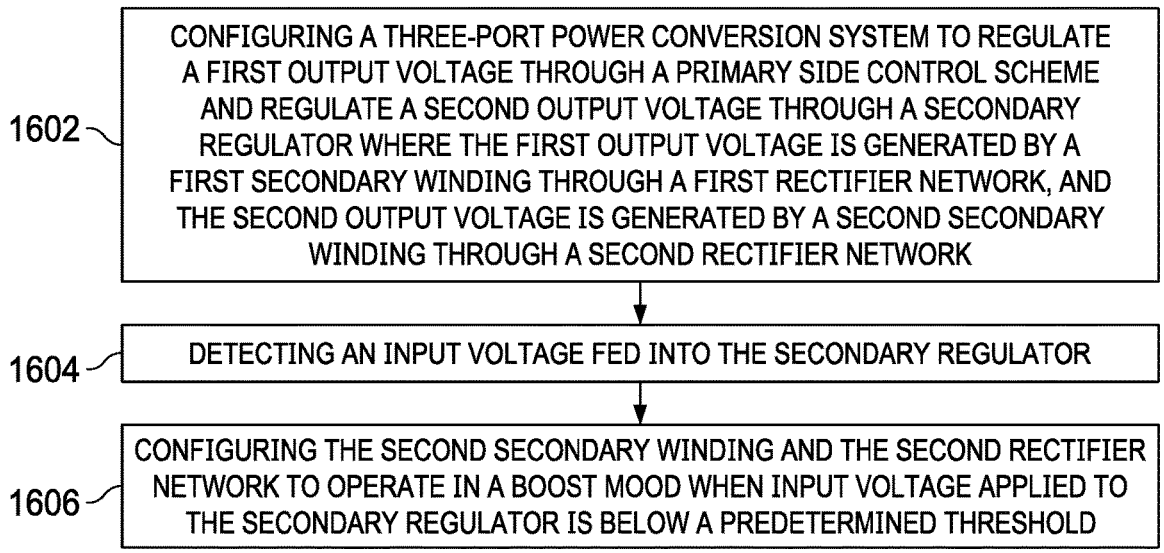
FIG. 16 illustrates a flow chart of yet another method for controlling the bidirectional three-port power conversion system shown in FIG. 3 in accordance with various embodiments of the present disclosure.

FIG. 16 illustrates a flow chart of yet another method for controlling the bidirectional three-port power conversion system shown in FIG. 3 in accordance with various embodiments of the present disclosure. This flowchart shown in FIG. 16 is merely an example, which should not unduly limit the scope of the claims. One of ordinary skill in the art would recognize many variations, alternatives, and modifications. For example, various steps illustrated in FIG. 16 may be added, removed, replaced, rearranged and repeated.

Referring back to FIG. 4, the three-level LLC resonant converter 104 and the first network 141 may is configured to operate at a boost converter mode. During the boost converter mode, the regulation of the output voltage of the LLC resonant converter is achieved through forcing the LLC resonant converter to operate in a manner similar to a boost converter. In particular, at the beginning of each switching period, switches S32 and S34 are simultaneously turned on and remain the on-state for a predetermined time period. Throughout the description, the predetermined time period is alternatively referred to as a boost period. During the boost period, switches S31 and S33 are turned off to prevent shoot-through.

During the boost period, the three-level LLC resonant converter 104 may operate in three different operating modes. In a first operating mode, during the boost period, switches S7 and S10 are in the on-state. The turned-on switches S7 and S10 lead to a first positive voltage applied to the input terminals of the resonant tank. At the same time, the turned-on switches S32 and S34 may short the secondary side winding of the transformer 191. Since the secondary side voltage of the transformer 191 is approximately equal to zero during the boost period, the reflected voltage at the primary side of the transformer 191 is approximately equal to zero. As a result, the input voltage is directly applied to the resonant tank. In response to such a voltage applied to the resonant tank, the current flowing through the resonant inductor Lr ramps up quickly in a manner similar to the current flowing through a boost inductor during the on period of a boost converter. In a second operating mode, during the boost period, switches S7 and S9 are in the on-state. The turned-on switches S7 and S9 lead to a second positive voltage applied to the input terminals of the resonant tank. The second positive voltage is about one half of the first positive voltage. Similar to the first operating mode, in response to the second positive voltage applied to the input terminals of the resonant tank, the current flowing through the resonant inductor Lr ramps up quickly in a manner similar to the current flowing through a boost inductor during the on period of a boost converter. In a third operating mode, during the boost period, switches S8 and S10 are in the on-state. The turned-on switches S8 and S10 lead to a third positive voltage applied to the input terminals of the resonant tank. The third positive voltage is about one half of the first positive voltage. Similar to the first operating mode, in response to the third positive voltage applied to the input terminals of the resonant tank, the current flowing through the resonant inductor Lr ramps up quickly in a manner similar to the current flowing through a boost inductor during the on period of a boost converter.

The energy is accumulated in the resonant inductor Lr. During a subsequent time period, the accumulated energy is released to the output of the LLC resonant converter. As a result, the output voltage of the LLC resonant converter is boosted to a higher level.

At step 1602, a three-port power conversion system is employed to convert an AC voltage from a single-phase AC source into a first DC voltage for a first DC load and a second DC voltage for a second DC load. In some embodiments, the first DC load is a main battery of an electric vehicle. The second DC load is an auxiliary battery of the electric vehicle. The primary side of the three-port power conversion system comprises a power factor correction device and an LLC resonant converter. The first DC load is connected to the secondary side of the three-port power conversion system through a first rectifier apparatus. The second DC load is connected to the secondary side of the three-port power conversion system through a second rectifier apparatus and a secondary regulator. The secondary regulator is implemented as a buck DC/DC converter.

In operation, the first DC voltage is regulated mainly through regulating the output voltage of the power factor correction device and partially through adjusting the LLC resonant converter in a narrow range. The second DC voltage is regulated through adjusting the duty cycle of the secondary regulator.

At step 1604, a suitable voltage sensor detects an input voltage fed into the secondary regulator.

At step 1606, after the input voltage of the secondary regulator is below a predetermined voltage threshold, the low side switches of the second rectifier are turned on simultaneously so as to short the secondary winding. As a result of having a shorted secondary winding, the output voltage of the second rectifier is able to generate a higher voltage.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method comprising:
    configuring a bidirectional multiple-port power conversion system as an alternating current (AC)/direct current (DC) power conversion system in response to an AC power source coupled to an input of the bidirectional multiple-port power conversion system, wherein a first port of the bidirectional multiple-port power conversion system comprises a power factor correction device and a primary power conversion network connected in cascade between an input of the first port and a primary winding of a transformer, a second port of the bidirectional multiple-port power conversion system comprises a plurality of switches and a plurality of diodes connected between a secondary side of the transformer and an output of the second port, and a third port of the bidirectional multiple-port power conversion system comprises a first switch network and a power regulator connected in cascade between the secondary side of the transformer and an output of the third port; and
    configuring the bidirectional multiple-port power conversion system as a DC/DC power conversion system in response to disconnecting the AC power source from the input of the bidirectional multiple-port power conversion system.

2. The method of claim 1, wherein the bidirectional multiple-port power conversion system comprises three ports, and wherein:
    the input of the first port of the bidirectional multiple-port power conversion system is configured to be coupled to an AC element;
    the output of the second port of the bidirectional multiple-port power conversion system is configured to be coupled to a first DC element; and
    the output of the third port of the bidirectional multiple-port power conversion system is configured to be coupled to a second DC element.

3. The method of claim 2, further comprising:
    configuring the first DC element as a DC power source; and
    configuring the second DC element as a DC load, wherein power is transferred from the DC power source to the DC load.

4. The method of claim 2, further comprising:
    configuring the first DC element as a DC power source; and configuring the AC element as an AC load, wherein power is transferred from the DC power source to the AC load.

5. The method of claim 2, further comprising:
configuring the first DC element as a DC power source;
configuring the second DC element as a DC load; and
configuring the AC element as an AC load, wherein the DC power source is configured to provide power to the DC load and the AC load simultaneously.

6. The method of claim 2, further comprising:
configuring the first DC element as a DC power source;
configuring the plurality of switches and the plurality of diodes as a full-bridge switching network;
configuring the primary power conversion network as a rectifier;
configuring the power factor correction device as an inverter; and
configuring the AC element as an AC load, wherein power is transferred from the DC power source to the AC load.

7. The method of claim 1, wherein:
the power factor correction device is a neutral-point clamped boost power factor correction converter; and
the primary power conversion network is a three-level inductor-inductor-capacitor (LLC) resonant converter.

8. The method of claim 1, wherein:
the plurality of switches and the plurality of diodes form a first rectifier comprising three diodes and one switch, and a second rectifier comprising four switches.

9. The method of claim 8, further comprising:
configuring the first rectifier as a first voltage doubler and the second rectifier as a second voltage doubler through configuring the one switch of the first rectifier and one switch of the second rectifier as always-on switches.

10. A method comprising:
transferring energy in a bidirectional multiple-port power conversion system including a first port configured to be coupled to an alternating current (AC) element, a second port configured to be coupled to a first direct current (DC) element, and a third port configured to be coupled to a second DC element, wherein:
the first port comprises a power factor correction device and a primary power conversion network connected in cascade between an input of the first port and a first winding of a transformer;
the second port comprises a secondary power conversion network comprising a first bridge and a second bridge connected in parallel, and wherein the first bridge is between a second winding of the transformer and the first DC element, and the second bridge is between a third winding of the transformer and the first DC element; and
the third port comprising a first network and a second network connected in cascade between a fourth winding of the transformer and the second DC element; and configuring the bidirectional multiple-port power conversion system as an AC/DC power conversion system in response to an AC power source coupled to the first port, and configuring the bidirectional multiple-port power conversion system as a DC/DC power conversion system or a DC/AC power conversion system in response to disconnecting the AC power source from the first port.

11. The method of claim 10, further comprising:
configuring the first DC element as a DC power source;
configuring the second DC element as a DC load; and
transferring power from the DC power source to the DC load through the secondary power conversion network, the first network and the second network.

12. The method of claim 10, further comprising:
configuring the first DC element as a DC power source;
configuring the AC element as an AC load; and
transferring power from the DC power source to the AC load through the secondary power conversion network, the primary power conversion network and the power factor correction device.

13. The method of claim 10, further comprising:
configuring the second DC element as a DC power source;
configuring the first DC element as a DC load; and
transferring power from the DC power source to the DC load through the second network, the first network and the secondary power conversion network.

14. The method of claim 10, further comprising:
configuring the second DC element as a DC power source;
configuring the AC element as an AC load; and
transferring power from the DC power source to the AC load through the second network, the first network, the primary power conversion network and the power factor correction device.

15. The method of claim 10, further comprising:
configuring the first DC element as a first DC power source
configuring the second DC element as a second DC power source;
configuring the AC element as an AC load;
transferring power from the first DC power source to the AC load through the secondary power conversion network, the primary power conversion network and the power factor correction device; and
transferring power from the second DC power source to the AC load through the second network, the first network, the primary power conversion network and the power factor correction device.

* * * * *